US012760843B2

(12) United States Patent
Granger et al.

(10) Patent No.: US 12,760,843 B2
(45) Date of Patent: Oct. 13, 2026

(54) FUEL TANK ASSEMBLY AND METHOD OF USING SAME

(71) Applicant: SLEEGERS ENGINEERED PRODUCTS, INC., London (CA)

(72) Inventors: Daniel Harry Granger, London (CA); Taylor Daniel Granger, London (CA); Kyle Alexander Squance, London (CA)

(73) Assignee: SLEEGERS ENGINEERED PRODUCTS, INC., London (CA)

(*) Notice: Subject to any disclaimer, the term of this patent is extended or adjusted under 35 U.S.C. 154(b) by 55 days.

(21) Appl. No.: 18/704,286

(22) PCT Filed: Oct. 26, 2022

(86) PCT No.: PCT/CA2022/051590

§ 371 (c)(1),
(2) Date: Apr. 24, 2024

(87) PCT Pub. No.: WO2023/070213

PCT Pub. Date: May 4, 2023

(65) Prior Publication Data

US 2024/0410527 A1 Dec. 12, 2024

Related U.S. Application Data

(60) Provisional application No. 63/276,334, filed on Nov. 5, 2021, provisional application No. 63/271,973, filed on Oct. 26, 2021.

(51) Int. Cl.
*F17C 9/02* (2006.01)
*F17C 13/02* (2006.01)

(52) U.S. Cl.
CPC .............. *F17C 9/02* (2013.01); *F17C 13/025* (2013.01); *F17C 13/026* (2013.01);
(Continued)

(58) Field of Classification Search
CPC ............ F17C 2250/03; F17C 2250/043; F17C 2250/0439; F17C 2221/012;
(Continued)

(56) References Cited

U.S. PATENT DOCUMENTS 3,848,559 A * 11/1974 Tarossi .................... B63B 25/16 114/74 A
5,357,758 A * 10/1994 Andonian ................. F17C 9/02 62/48.1

(Continued)

FOREIGN PATENT DOCUMENTS

DE 102021203643 A1 10/2022
JP 2011000922 A 1/2011

(Continued)

OTHER PUBLICATIONS

An International Search Report and Written Opinion issued in the corresponding PCT/CA2022/051590, date of mailing Dec. 22, 2022.

*Primary Examiner* — Nelson J Nieves
(74) *Attorney, Agent, or Firm* — NORTON ROSE FULBRIGHT CANADA LLP

(57) ABSTRACT

A fuel tank assembly is provided. The fuel tank assembly comprises a fuel tank having an inner volume defined by the fuel tank; and at least one conduit coupled to said fuel tank. The fuel tank is configured to couple to, and fluidly communicate fuel to, a fuel system of a motor vehicle. An inlet of each conduit is configured to fluidly communicate with and receive heat transfer fluid from a heat source and an outlet of each conduit is configured to fluidly communicate with and send the heat transfer fluid to the heat source. The
(Continued)

at least one conduit is in thermal communication with an inner volume of the fuel tank for transferring heat from the heat transfer fluid to fuel within the fuel tank.

4 Claims, 16 Drawing Sheets

(52) U.S. Cl.
CPC ................. *F17C 2201/0109* (2013.01); *F17C 2201/035* (2013.01); *F17C 2205/0103* (2013.01); *F17C 2205/013* (2013.01); *F17C 2205/018* (2013.01); *F17C 2205/0326* (2013.01); *F17C 2221/012* (2013.01); *F17C 2221/035* (2013.01); *F17C 2227/0323* (2013.01); *F17C 2250/03* (2013.01); *F17C 2250/043* (2013.01); *F17C 2250/0439* (2013.01); *F17C 2270/0168* (2013.01)

(58) Field of Classification Search
CPC ........ F17C 2221/035; F17C 2205/0103; F17C 2205/013; F17C 2205/018; F17C 2205/0326; F17C 2227/0323; F17C 2227/0309; F17C 2227/0302; F17C 2270/0168
See application file for complete search history.

(56) References Cited

U.S. PATENT DOCUMENTS 5,409,046 A * 4/1995 Swenson ................... F17C 9/02 141/2
7,757,726 B2 * 7/2010 Handa ..................... F17C 5/007 141/82
8,752,596 B2 * 6/2014 Mori ....................... F17C 3/025 62/53.2
10,495,257 B2 * 12/2019 Mathison ................ F17C 5/007
2004/0247959 A1 * 12/2004 Kimbara ................. B60L 50/72 429/437
2004/0251007 A1 * 12/2004 Toh ........................... F17C 1/00 165/157
2006/0180235 A1 * 8/2006 Kubo ................ H01M 8/04201 141/82
2007/0000016 A1 1/2007 Handa
2010/0089070 A1 4/2010 Allgeier et al.
2016/0075508 A1 * 3/2016 Tamburello .......... B65D 88/748 165/46
2016/0281931 A1 * 9/2016 Karlsson ................... F17C 9/04
2023/0375136 A1 * 11/2023 Orchard .................... F17C 7/04
2025/0067402 A1 * 2/2025 Sleiman .................. F17C 13/12

FOREIGN PATENT DOCUMENTS

WO 2009/078757 A1 6/2009
WO 2018/082773 A1 5/2018

* cited by examiner

FUEL TANK ASSEMBLY AND METHOD OF USING SAME

FIELD

The present disclosure generally relates to fuel tanks, and in particular, to fuel tank heating.

INTRODUCTION

Propane automotive motor fuel tanks are used to store and provide fuel for engines in vehicles that are operating on fuel sources such as propane, as a sole source of fuel or as a second source of fuel. Propane's nature is such that as its temperature rises, its pressure rises and conversely as the temperature falls, the pressure falls. Engine system engineers have a challenge getting the correct amount of propane at the correct pressure from the fuel tank to the engine compartment where it is injected as a fuel in either vapour or liquid form. Engine systems also have a minimum pressure requirement for fuel in a fuel tank.

SUMMARY

In accordance with an aspect, there is provided a fuel tank assembly. The fuel tank assembly (e.g., container, cylinder, vessel) comprises a fuel tank, and at least one tube or pipe or box affixed (e.g., welded) to said fuel tank. Heated engine coolant enters one end of at least one tube or pipe and out the other end back to the engine. Heat from said heated engine coolant is transferred through the tube or pipe wall to the fuel tank wall and then into the fuel within the container (e.g., propane within the tank) to raise the temperature of the fuel. In embodiments described herein, the fuel is referred to as propane; however, other fuels such as hydrogen, hydrocarbons (e.g. butane), dimethyl ether (DME), propane, renewable propane, ammonia, and mixtures thereof, are within the definition of fuels according to this disclosure. In a specific example, hybrid fuels such as mixtures of at least two of DME, ammonia, hydrogen, butane, propane, and/or renewable propane may be a fuel according to this disclosure.

In accordance with another aspect, there is provided a method of heating a fuel tank. The method comprises receiving an indication that a pressure associated with a fuel tank valve is below a first threshold, and actuating a solenoid valve associated with an engine coolant system such that the solenoid valve releases heated coolant into a tube or pipe affixed (e.g., welded) to the fuel tank.

In another aspect, a fuel tank assembly is provided comprising: a fuel tank having an inner volume defined by the fuel tank, the fuel tank configured to couple to, and fluidly communicate fuel to, a fuel system of a motor vehicle; and at least one conduit coupled to said fuel tank, wherein an inlet of each conduit is configured to fluidly communicate with and receive heat transfer fluid from a heat source of the motor vehicle and an outlet of each conduit is configured to fluidly communicate with and send the heat transfer fluid to the heat source. The at least one conduit is in thermal communication with an inner volume of the fuel tank for transferring heat from the heat transfer fluid to fuel within the fuel tank.

In an embodiment, the at least one conduit extends along a length of a surface of the fuel tank.

In another embodiment, the at least one conduit extends into the inner volume of the fuel tank. The inlet and outlet may extend through a mounting flange of the fuel tank, and the inlet and outlet may be supported by the mounting flange. The fuel tanks may define a opening; and the mounting flange may be coupled to the fuel tank and seal the opening.

In another embodiment, the fuel tank assembly comprises a plurality of conduits.

In another embodiment, the fuel tank assembly comprises a heating element for heating fuel within the fuel tank.

In another embodiment, the fuel tank assembly comprises at least one reservoir coupled to the fuel tank, each of the at least one reservoir in fluid communication with a corresponding conduit of the at least one conduits, where the reservoir is in thermal communication with the inner volume of the fuel tank.

In another embodiment, each conduit comprises an expansion loop.

In another embodiment, the fuel tank assembly comprises a first valve positioned to control flow through the inlet of each conduit, and a second valve positioned to control flow through the outlet of each conduit.

Embodiments may include combinations of the above features.

In another aspect, a system for controlling the flow of heat exchange fluid to a fuel tank assembly is provided. The system comprises: the fuel tank assembly described in this disclosure; a heat source in fluid communication with a radiator; a pump for circulating heat transfer fluid between the heat source, the radiator and each conduit; at least one first valve positioned to control flow through the inlet of each conduit; and a controller configured to control the flow of heat exchange fluid through the at least one first valve.

In an embodiment, the controller is configured to: receive real time data indicative of at least one of a temperature and pressure in the inner volume of the fuel tank; when the at least one of the temperature and pressure is below or equal to a first threshold value, generate a first output for communicating with the at least one first valve to open and direct a portion of the heat transfer fluid through the at least one conduit; when the at least one of the temperature and pressure is above a second threshold value, generate a second output for communicating with the at least one first valve to close and stop flow of the heat transfer fluid through the at least one conduit. In an example, the second threshold value is greater than the first threshold value. In another example, the first threshold value is at least one of in a range of about 100-500 psi, in a range of 0-250 psi, in a range of 50-150 psi, or about 70 psi. In another embodiment, the second threshold value is less than or equal to 75% of a maximum allowable working pressure of the fuel tank. The maximum allowable working pressure may be about 500 psi.

In another embodiment, at least one second valve is positioned to control flow through the outlet of each conduit, where the first valve is positioned to control flow through the inlet of each conduit; and the controller is configured to: receive real time data indicative of a pressure in the at least one conduit; and when the pressure in the at least one conduit is greater than a third threshold value, generate a third output for communicating with and signaling the at least one first valve and the at least one second valve to close.

In an embodiment, the third threshold is greater than a radiator operating pressure. The radiator operation pressure may be in a range of 1-20 psi. The third threshold may be in a range of about 15-35 psi. In an example is third threshold may be about 25 psi.

In another embodiment, the controller is configured to: receive real time data indicative of at least one of a temperature and pressure in the inner volume of the fuel tank; and generate an output to the at least one first valve to control a flow rate of heat transfer fluid through the at least one conduit to maintain the at least one of the temperature and pressure in a desired range. The desired range may be in a range from 50 psi to within 50 psi of a maximum allowable working pressure of the fuel tank, preferably in a range of about 100-500 psi.

In another embodiment, the heat source is an engine of the motor vehicle.

Embodiments may include combinations of the above features.

In another aspect, a method of heating a fuel tank is provided. The method comprises: receiving an indication that a pressure inside the fuel tank is below a first threshold; actuating a valve associated with an engine coolant system such that the valve releases heated heat transfer fluid from the engine coolant system into a conduit coupled to the fuel tank; circulating the heat transfer fluid through the conduit.

In an embodiment, the method comprises: receiving an indication that the pressure associated with the fuel tank is above a second threshold; and actuating the valve to prevent further heated heat exchange fluid from entering the conduit.

In another embodiment, the method comprises: receiving an indicating that a pressure in the conduit is greater than a third threshold value; actuating a plurality of valve to isolate the conduit from the engine coolant system.

In another embodiment, the method comprises controlling a flow rate of heat transfer fluid through the conduit to maintain the pressure in a desired range.

Embodiments may include combinations of the above features.

In an aspect, a fuel tank assembly is provided comprising: a fuel tank having an inner volume defined by the fuel tank, the fuel tank configured to couple to, and fluidly communicate fuel to, a fuel system of a heater; and at least one conduit coupled to said fuel tank, wherein an inlet of each conduit is configured to fluidly communicate with and receive heat transfer fluid from a heat source of the heater and an outlet of each conduit is configured to fluidly communicate with and send the heat transfer fluid to the heat source. The at least one conduit is in thermal communication with an inner volume of the fuel tank for transferring heat from the heat transfer fluid to fuel within the fuel tank.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
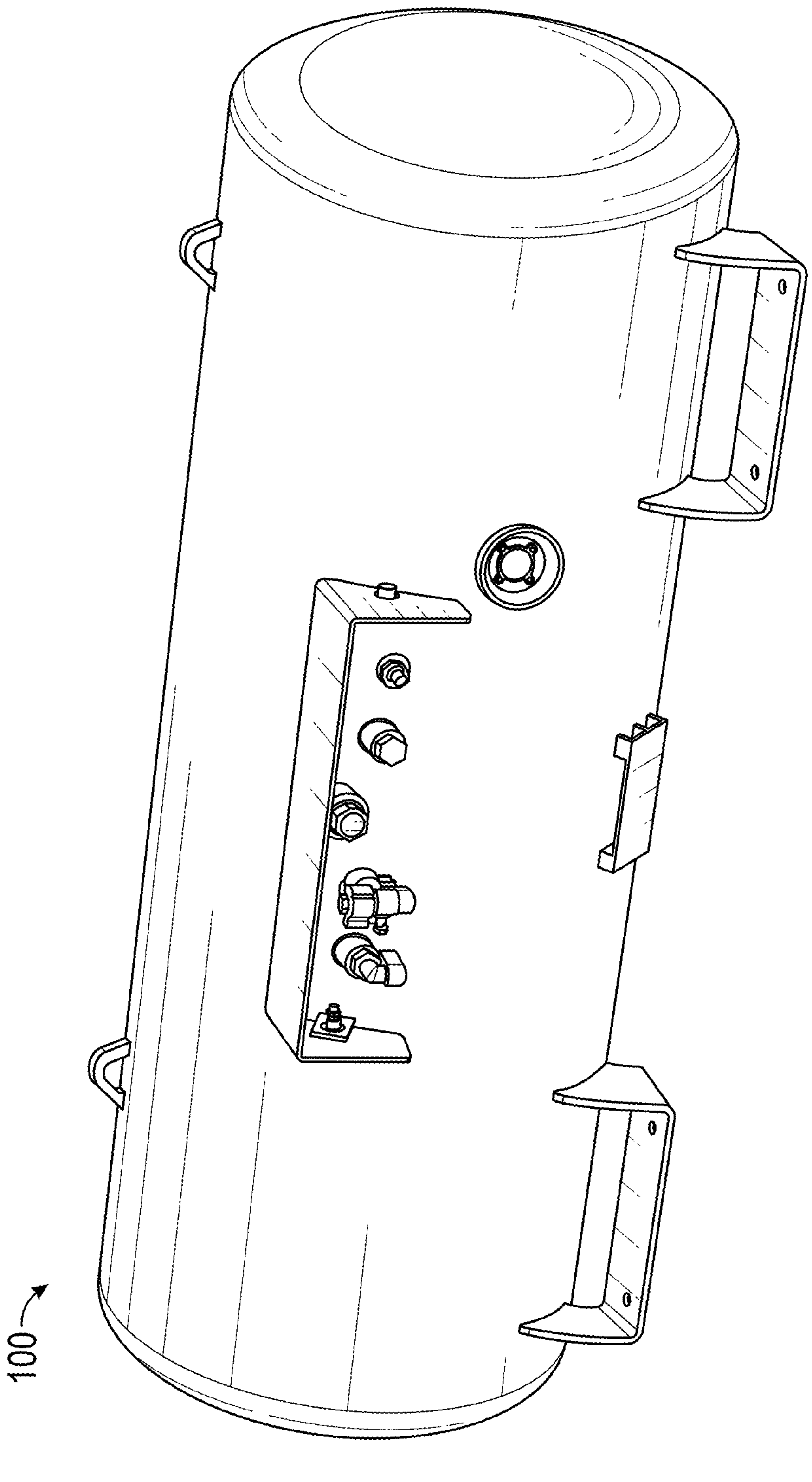
FIG. 1 illustrates an example of a single tank.

Embodiments of methods, systems, and apparatus are described through reference to the drawings. Applicant notes that the described embodiments and examples are illustrative and non-limiting. Practical implementation of the features may incorporate a combination of some or all of the aspects, and features described herein should not be taken as indications of future or existing product plans.

Although terms such as "maximize", "minimize" and "optimize" may be used in the present disclosure, it should be understood that such term may be used to refer to improvements, tuning and refinements which may not be strictly limited to maximal, minimal or optimal.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related.

Terms such as "up to", "at least", "greater than", "less than", "more than", "or more", and the like, include the number recited and such terms refer to ranges that can be subsequently broken down into sub-ranges. In the same manner, all ratios recited herein also include all sub-ratios falling within the broader ratio.

The singular forms "a," "an," and "the" include the plural reference unless the context clearly dictates otherwise. The term "and/or" means any one of the items, any combination of the items, or all of the items with which this term is associated.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

The term "tank", also referred to in this disclosure as a "tank and pipe assembly", may refer to pressure vessels in a fuel assembly for a motor vehicle, e.g. an automobile, bus, or truck (e.g. a class 3 or greater truck). The tank may be in fluid communication with an engine, e.g. an engine of the motor vehicle, or a heater, e.g. a residential or agricultural heater/burner.

The term "heat transfer fluid" may refer a gas or liquid used as a heat transfer medium. Example heat transfer fluids may include, glycol, water, and mixtures thereof; and engine coolant, e.g. Fleetguard™ coolants such as Fleetcool™ EX.

The term "pipe", "tube", and "conduit" may be used interchangeably as an enclosed structure defining a flow path for heat transfer fluid to and from tanks according to this disclosure.

The term "thermal communication" refers to the transfer of heat energy by conduction between objects directly or indirectly coupled to each other.

Aspects of various embodiments are described through reference to the drawings.

FIG. 1 illustrates an example of a single tank 100 prior to the installation of piping or tubing.

Figure 2:
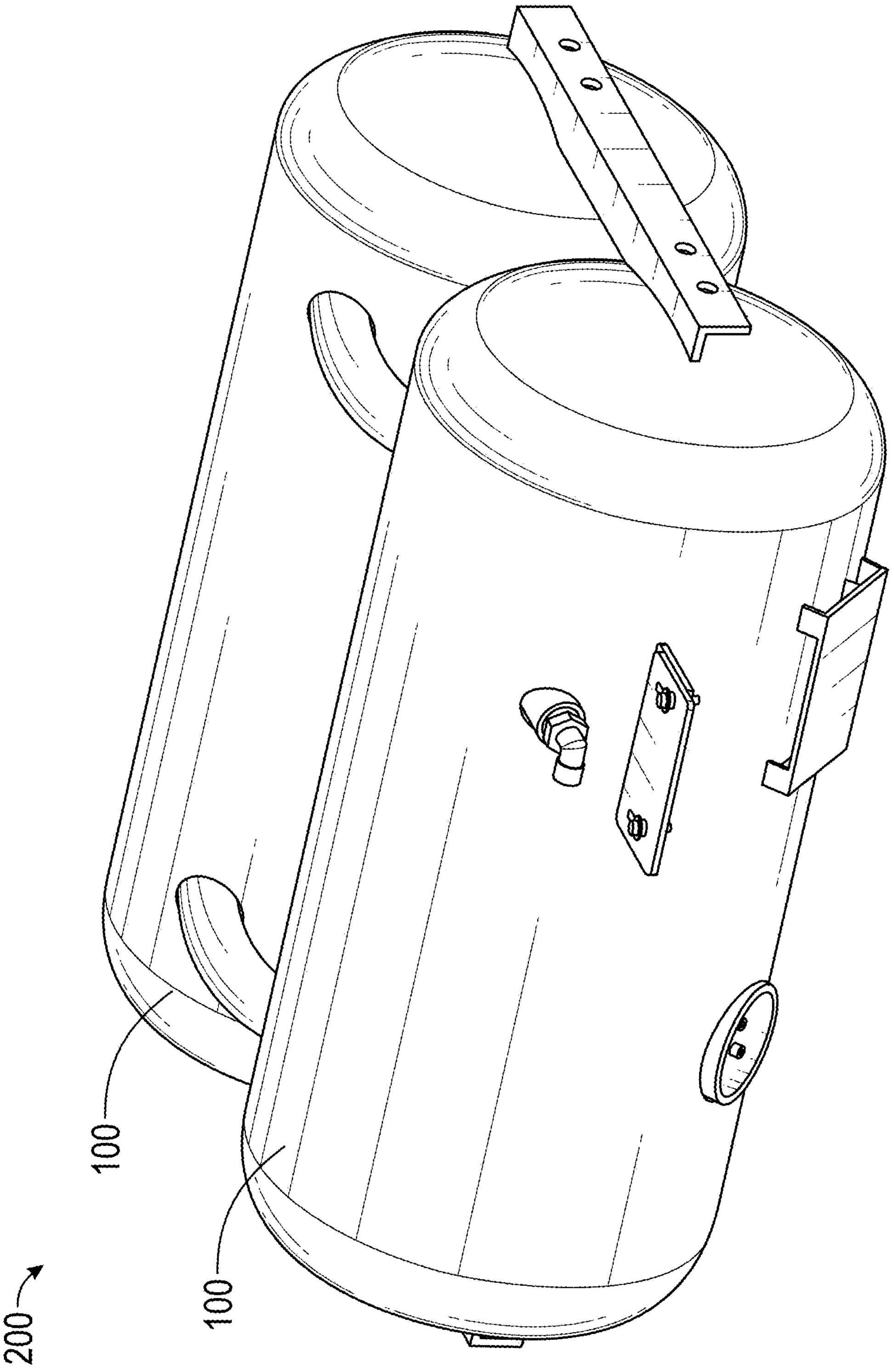
FIG. 2 illustrates an example of a tank manifold.

FIG. 2 illustrates an example of a tank manifold 200 prior to the installation of piping or tubing.

Figure 3:
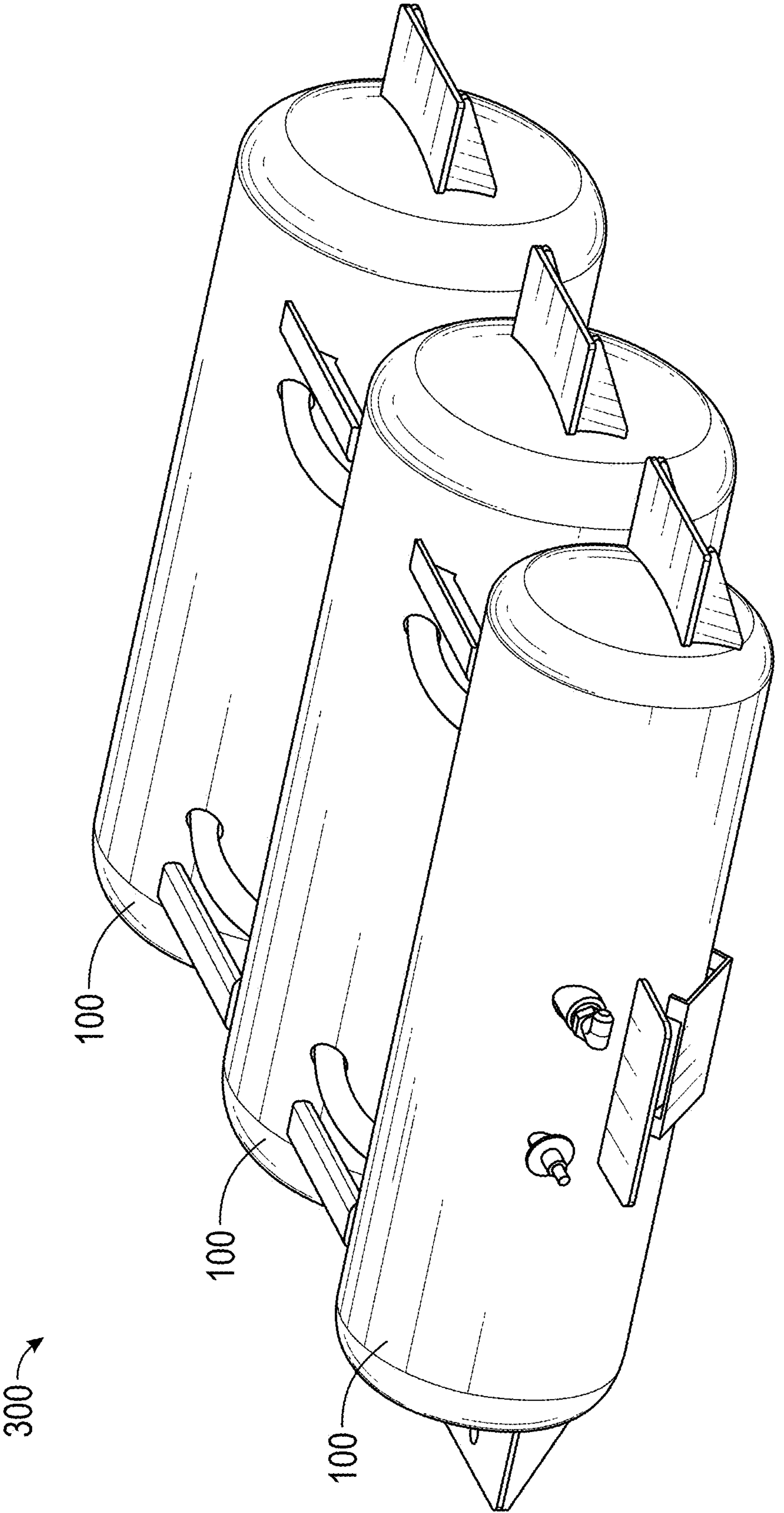
FIG. 3 illustrates an example of a triple manifold tank.

FIG. 3 illustrates an example of a triple manifold tank 300 prior to the installation of piping or tubing.

Environmental factors, such as cold climate, ice, and snow may reduce temperature and pressure of fuel inside a fuel tank. Reduced vapour pressure within the fuel tank may prevent a engine using fuel within the fuel tank from starting and/or operating optimally as a fuel injector of the engine may not be able to compensate for low vapour pressure and/or sudden decreases in vapour pressure. Further, when fuel demand is high, e.g. when an engine of a motor vehicle is powering the motor vehicle up a hill, liquid and/or vapour fuel will be withdrawn rapidly from the fuel tank causing liquid fuel to move from the liquid phase to the gas phase thereby rapidly reducing temperature and vapour pressure within the tank. A controller of the engine may cause the fuel injector to change the amount of fuel, and/or pressure of the fuel, injected into the combustion based upon the temperature/pressure of the fuel in the fuel tank. However, the fuel tank temperature and pressure is too low, then the fuel injector may not be able to compensate and the engine may not operate. To overcome some of the challenges of fuel delivery due to changes in temperature and pressure combinations of compressed fuels (e.g., propane has a boiling point of minus 42 degrees Celsius wherein propane vapour condenses and vapour pressure falls to zero psi at steady state), engine designers may use a variety of methods to boost the pressure of the fuel, either in gaseous form or for liquid direct injection. This could include inline pumps, submerged pumps inside the fuel tank, booster pumps, or a vapourizer. This disclosure may provide an alternative way of increasing a fuel's temperatures and/or vapour pressure. In an aspect, a tank and pipe assembly to allow heat transfer between a fuel tank and heat transfer fluid, e.g. engine coolant, is provided.

Figure 4A:
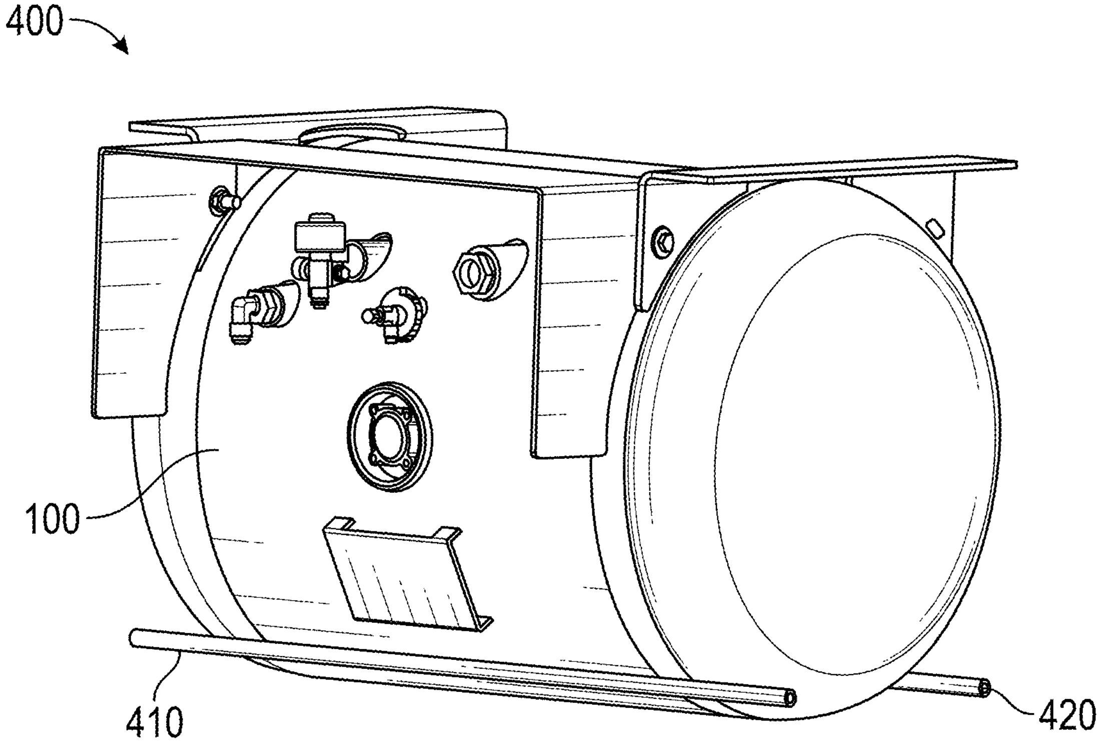
FIGS. 4A to 4C illustrate different perspectives of an example of a single tank and pipe assembly, in accordance with some embodiments.
Figure 4B:
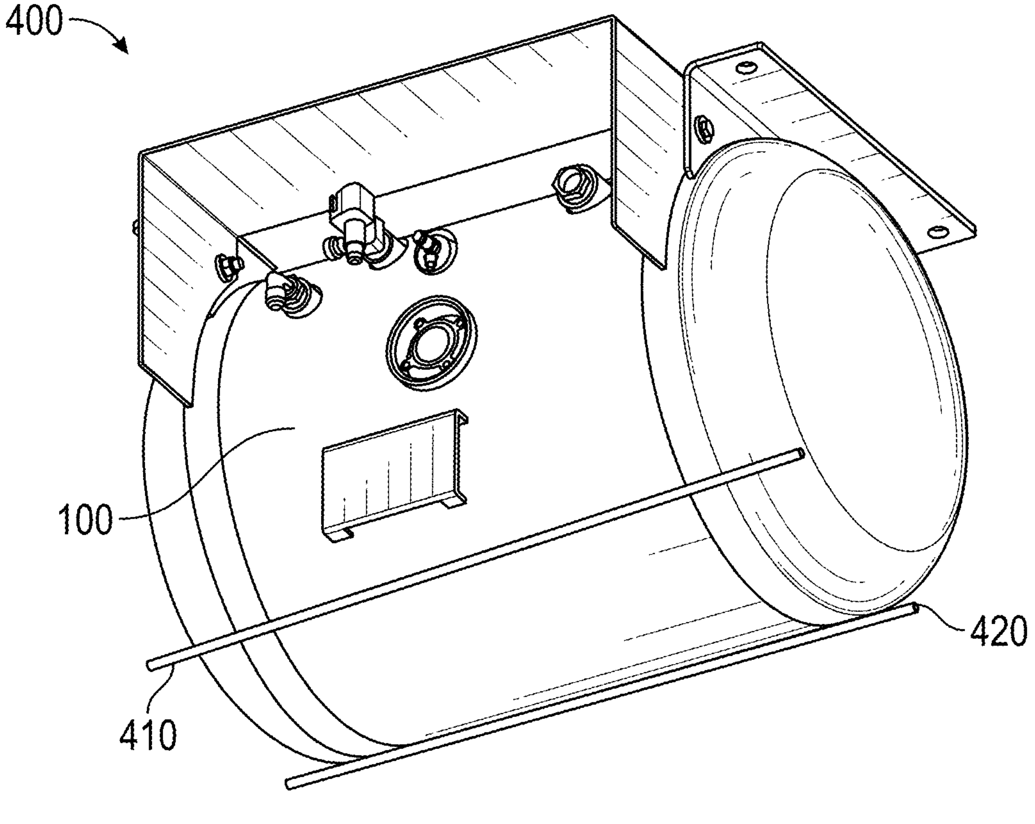
Figure 4C:
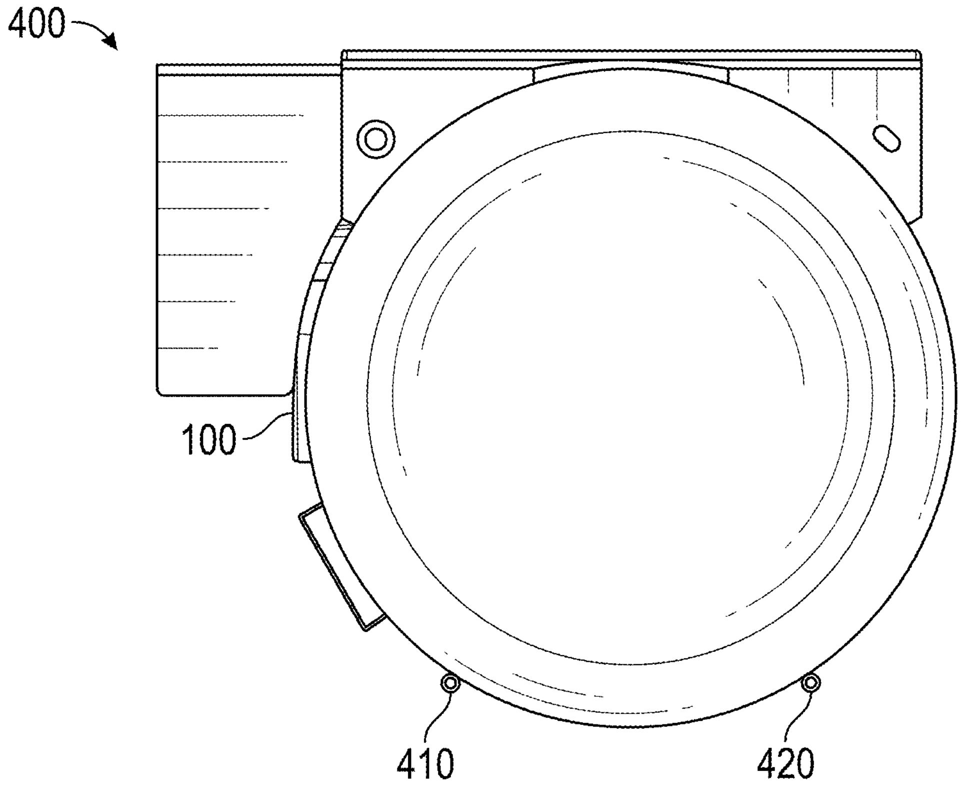

FIGS. 4A to 4C illustrate different perspectives of an example of a single tank and pipe assembly 400, in accordance with some embodiments. The assembly 400 comprises a single tank 100 and pipes 410, 420 that are affixed (e.g., welded) to abut a length of an external surface of the tank 100. As shown, pipes 410, 420 may extend along the entire length of an external surface of tank 100.

In some embodiments, there may be more, fewer, and/or larger tube or pipes weld to the tank 100. It should be understood that tanks may come in different shapes and sizes and manifolds may come in different configurations and number of tanks. It should also be understood that since tanks come in different diameters, conduit, tubes, or pipes may be sized and shaped with corresponding curvatures such that surface area of the abutment between the tank and the tubes or pipes is optimized. I.e., piping or tubing may be affixed (e.g., welded, attached with screws or bolts (e.g., bolted to pads welded or otherwise attached to the tank), tied, etc.) to the tank such that a surface area of the piping or tubing is in contact with the tank wall.

In some embodiments, tubes or pipes may be welded across a tank manifold 200, or triple manifold tank 300. There may be separate tubes or pipes spanning a length of each tank 100 in the manifold 200 or triple manifold 300. Alternatively or additionally, pipes may span across the manifold 200 or triple manifold 300 such that a pipe may be welded or otherwise affixed to more than one tank 100. In other embodiments, additional configurations may be used, including a configuration whereby one or more tubes or pipes may be welded across the lengths of each tank (for example in an S-shape under the triple manifold 300). Combinations of single tank tubes or pipes and multiple tank tubes or pipes may also be envisioned. In some embodiments, one or more tubes that conform to the diameter of the shell of a tank may be welded (or otherwise affixed) to each cylinder that is part of the tank. For example, for single tanks, one cylinder may be used, whereas for manifold tanks there may be 2 or more cylinders.

It should be understood that in some embodiments a "C" channel may be weld to the tank such that the coolant may flow within the channel an come into direct contact with the tank wall. However, for additional safety, a full tube or pipe is recommended over a "C" channel.

In some embodiments, heated engine coolant (engine coolant which absorbed the heat from the operation of the engine that is usually disposed of through the engine radiator) may be used to heat the propane in the tank to create propane pressure that can then be used to control the delivery of the propane to the engine. For example, several runs or sections of steel tube or pipe may be welded or affixed to the underside of the tanks from end to end. The engine coolant may be run from the engine through those tube or pipes and back to the engine. Temperature and the corresponding pressure within the tank would be regulated by the heating provided by the flow of the coolant from the engine, and if heating was not needed, the coolant would be restricted from the tank and diverted to the radiator instead.

In some embodiments, the engine system designer may build into their system a pressure sensor that reads the pressure within the tank. If more pressure is needed, more flow of heated coolant may be allowed to flow through the tubes or pipes, thereby bringing more heat and energy to the tank surface. Eventually the heated and energy transferred to the tank surface will raise the temperature within the tank, and correspondingly increase the pressure that the tank propane was exerting/producing. In some embodiments, this could be controlled by thermocouple sensors (or any temperature and/or pressure sensors) and solenoid (or any electrical or mechanical switch) valves that control the flow of glycol or coolant from the engine only when it is needed to prevent too much heat in the tank causing excessive vapour pressures. It should be understood that other means of redirecting the heat exchange fluid (e.g., coolant) may be used in place of valves (e.g., any electrical or mechanical switch). The tubes or pipes would be transmitting heat thought the wall of the pressure vessel via the pressure vessel's contact with the pipes or tubes at the welds, and via any radiant heat transfer from the engine coolant that is flowing due to the close proximity of the tubes or pipes, to the shell of tank, and through the shell of the tank to the propane inside. These engines run at coolant temperatures of about 180 degrees Fahrenheit and therefore there is more than enough heat from the engine to transfer to the tank shell from the pipes and tubes to cause the fuel inside to rise in temperature. Such rise in temperature will create higher vapour pressures which in turn can be used to push liquid and/or vapour fuel to the engine or be injected as a pressurized gas into the engine during combustion.

In some embodiments, the bottom of the tank (or the entire tank) may be wrapped or covered to reduce the cooling effects of air movement over the tank as the vehicle is in motion.

Welding the tubes or pipes to the tank bottom prior to coating allows for the entire assembly to be powder coated as one unit, reducing opportunity for uncoated areas that could rust over time. While the coolant system ultimately heats the tank, the propane vessel and the coolant system operate in two separate systems that may be welded to each other in certain areas of the pressure vessel but are otherwise completely separate and independent of each other.

To cover the lower portion of the tank, a metal cover (or plastic cover or other material) may be fastened on to the assembly after the metal fabrication and coating processes are complete.

In some embodiments, coolant would flow in one end and out the other end on its way back to the engine. There could be a separate manifold or plumbing combination that takes the coolant and distributes it to each tube or pipe, and then collects it at the other end.

The above structure allows for heat transfer of the heat produced from an engine, through a liquid (like radiator coolant from the engine) so that this heat from the liquid can be transferred into the tank wall of the propane tank 100 and then through that tank wall to the propane that is within the propane tank 100. This may allow control of the pressure existing in the propane tank (i.e., as propane temperature rises, it creates a specific propane pressure). This controlled pressure within the tank can then be harnessed and managed for various uses. For example, an application can control the pressure within the tank (and temperature of the propane by association) by controlling the heat that is made available to the tank shell from the liquid transfer system. Control of the heat available to be transferred into the tank shell can be controlled by controlling the volume of flow of the heated heat transfer fluid passing through the conduit (i.e., more heat is created by more flow, or heat is reduced by restricted flow).

In some embodiments, a tube or pipe may be shaped where one side is bent inward to follow the contour of the tank for easier welding and fabrication. This would provide more surface area touching the tank.

Figure 5:
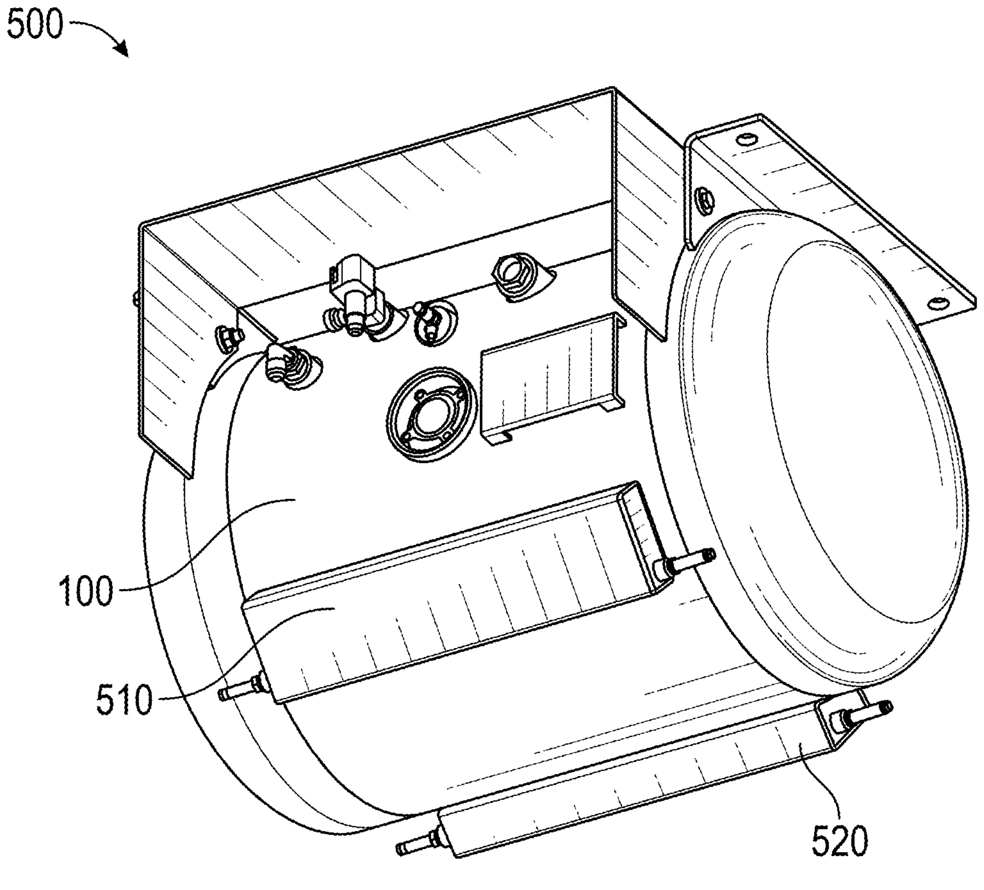
FIG. 5 illustrates an example of a single tank with rectangular tubes affixed to on the tank to provide more surface area of contact for heat transfer, in accordance with some embodiments.

FIG. 5 illustrates an example of a single tank 100 with rectangular tubes 510, 520 welded to on the tank to provide more surface area of contact for heat transfer, in accordance with some embodiments. In some embodiments, more than two runs of tubes, illustrated as rectangular tube when view from above in a plan view, may be welded along the tank 100 to provide further surface area contact. In some embodiments, a wider channel may be used to provide greater surface area for heat transfer from the channel to the tank shell surface. In some embodiments, the each tube may be coupled to and define a segment of the surface of the tank, e.g. each tube may define in a range of 1-50%, 1-25%, or 1-10% of the surface area of the tanks. As shown, rectangular tube 510, 520 may be positioned on an external surface of tank 100.

It should be noted that the tank shell may be independent of the channel, so that a crack in the tank wall will not have access to the interior of the channel. I.e., the heating liquid in the channel (e.g., tubes 410, 420, 510, 520) is in a completely separate system from the fuel, e.g. propane, in the tank 100. This will protect the liquid heat transfer system from ever seeing the propane pressure due to a tank shell failure.

By transferring heat generated by the operation of the engine to the engine coolant and then transfer the heat from the engine coolant through the tubes or pipes 410, 420 to fuel tank 100, the fuel in the tank 100 may be sufficiently heated such that the pressure in the tank 100 can be maintained at a suitable level.

In some embodiments, the piping or tubing may comprise a wide tube shaped to curve around a portion of a diameter of the tank shell, thereby increasing surface area where the piping or tubing is in contact with the tank shell.

In some embodiments, the piping or tubing may come in contact with any portion of the tank that allows for heat transfer from the piping or tubing to the tank, ultimately heating the pressurized gas in the tank. For example, a piping connected to a disc-shaped compartment or reservoir may be used such that the disc is shaped to be affixed to a bottom of a tank.

While the examples above have been described with the use of engine coolant as the heat exchange fluid medium in which heat is added to the tubing or piping, other mediums may be used. For example, an engine's exhaust system may pass heated exhaust through the tubing or piping. A vehicle's climate control system may be used to send different temperatures of air through the tubing or piping. I.e., the piping or tubing may be used to add heat to, or remove heat from, the tank (or other container) shell based on the temperature of the medium that is added to the piping or tubing. In some embodiments, there may be a plurality of tubing or piping such that a different medium may be used with different tubes or pipe. It should be understood that each medium used may be associated with different connectors on the tubing or piping with associated engine or vehicle components (including appropriate valves) that control and supply that medium.

Figure 6:
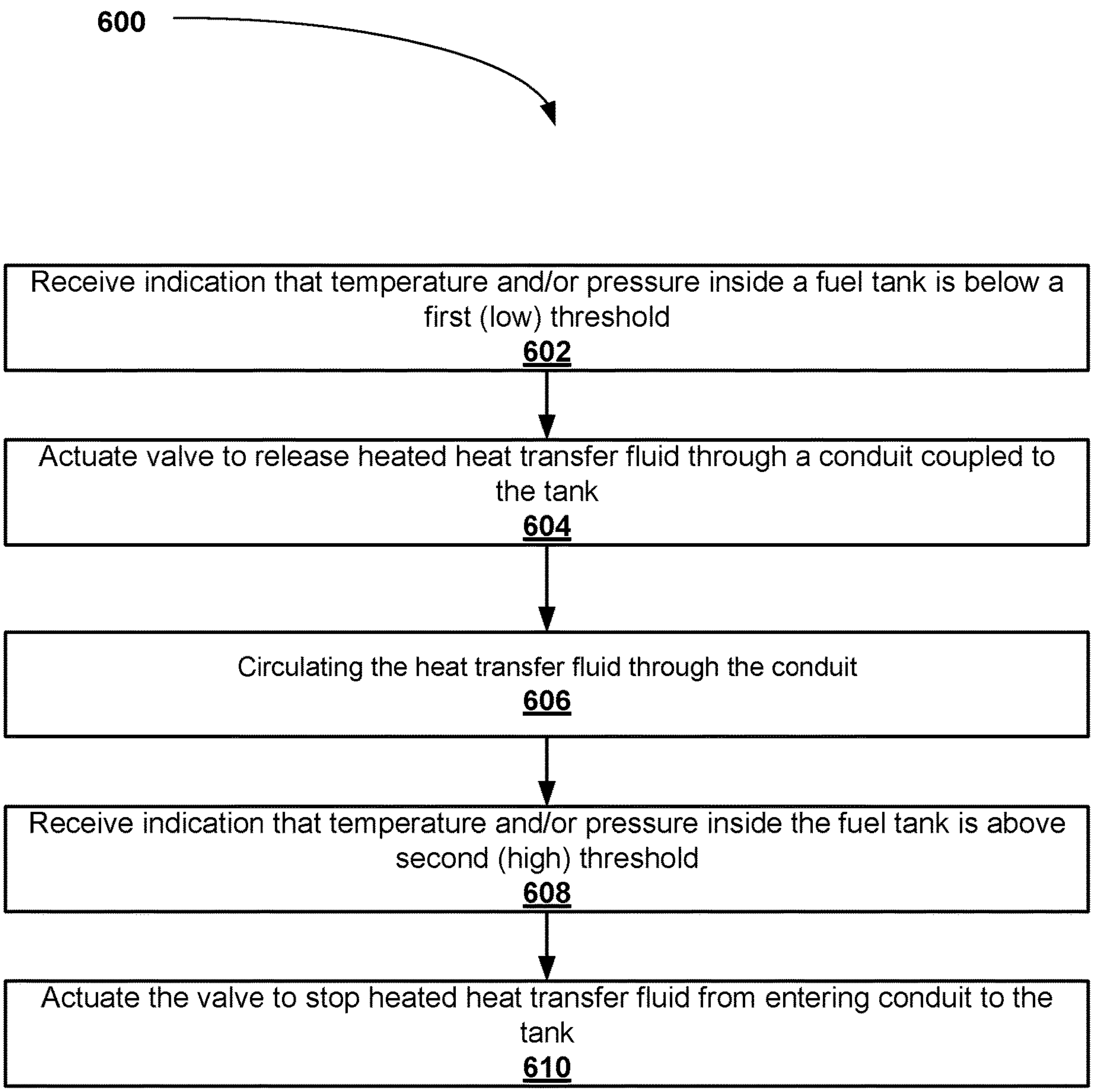
FIG. 6 illustrates, in a flowchart, an example of a method of heating a fuel tank, in accordance with some embodiments.

FIG. 6 illustrates, in a flowchart, an example of a method 600 of heating a fuel tank, in accordance with some embodiments. The method 600 may be performed by a processor according to this disclosure that reads instruction in a memory that when executed by the processor case the process to perform the method. A controller may be associated with a vehicle that is electrically connected to a pressure sensor at the fuel tank and valves, e.g. a solenoid valve, in the engine. If the processor receives an indication from the pressure sensor that the pressure of the propane fuel is below a predetermined first (low) threshold 602, then the processor may generate an output to actuate 604 the valves to send heated coolant through the conduit, e.g. tubes or pipes, that are coupled to, or extend into, the fuel tank. Heated engine coolant is then circulated 606 through the conduit to heat the fuel within the fuel tank. When the pressure sensor sends an indication that the pressure of the fuel is above a predetermined second (high) threshold 608, then the processor may actuate 610 the valves to stop the flow of heated coolant through the conduit. Each fuel tank has a maximum allowable working pressure (MAWP) and the threshold value selected may be limited by the MAWP. MAWP of a fuel tank may vary based on the application in which the fuel tank is used; however, each fuel tank will have an MAWP setting an upper limit for the working pressure of the fuel tank. In an example, the MAWP and thus maximum threshold value may be about 500 psi. In other examples, the MAWP may be greater than 500 psi. Other steps may be added to the method 600. In some embodiments, a temperature sensor may be used to detect the temperature at the tank surface in place or in addition to the information received from the pressure sensor.

It should be noted that while the above description was directed to the heating of propane, other pressurized fuels that respond to heat may also be heated as taught herein, with corresponding high and low pressure thresholds. Propane is a liquid and a vapour under pressure (i.e. a two-phase system). As the temperature rises, the pressure rises from more vapour (and slightly less liquid). There are other emerging products that have the same characteristics, such as di methyl ether (DME), ammonia, hydrocarbons such as butane, and varieties of such fuels that are now being "grown" as renewable (e.g., "renewable propane" can be derived from organic sources and can be taken from digesters of waste etc.). The above teachings may be applied to all of these pressurized fuels, and mixtures thereof, as they share the basic principle that as temperature of the two-phase system increases then pressure increases, e.g. as liquid in the two-phase system turns to vapour, and vice-versa. Limiting the flow of heated heat transfer fluid, e.g. engine coolant, when a corresponding high pressure threshold is met allow for pressurized fuel to be safely heated without causing an explosion.

Alternative embodiments to the tank and pipe assembly 400 are possible. While manifold tanks and pipe assemblies are also possible, the following description pertains to examples of a single tank and pipe assembly for ease of presentation. For example, FIGS. 7A to 7F illustrate alternative examples of a single tank and pipe assembly 700A, 700B, 700C, In accordance with some embodiments, heated liquid and/or gas may be passed through a pipe 720, 730, 740, 750, 760 that enters the tank 710 at one location and exits at another. As the heated liquid and/or gas passes through the pipe 720 inside the tank 710, the heat is transferred through the pipe 720 to the contents of the tank (i.e., gas and/or liquid).

This concept can have various entry and exit points in the heads or shell of the tank 710 with various sizes and shapes of pipe 720 used to transfer the heat into the tank. The pipe 720 could be welded or otherwise affixed directly to the shell or be welded or otherwise affixed to fittings that are installed in the shell (e.g., for the pipe to be bolted, treaded, etc. onto the fittings).

Figure 7A:
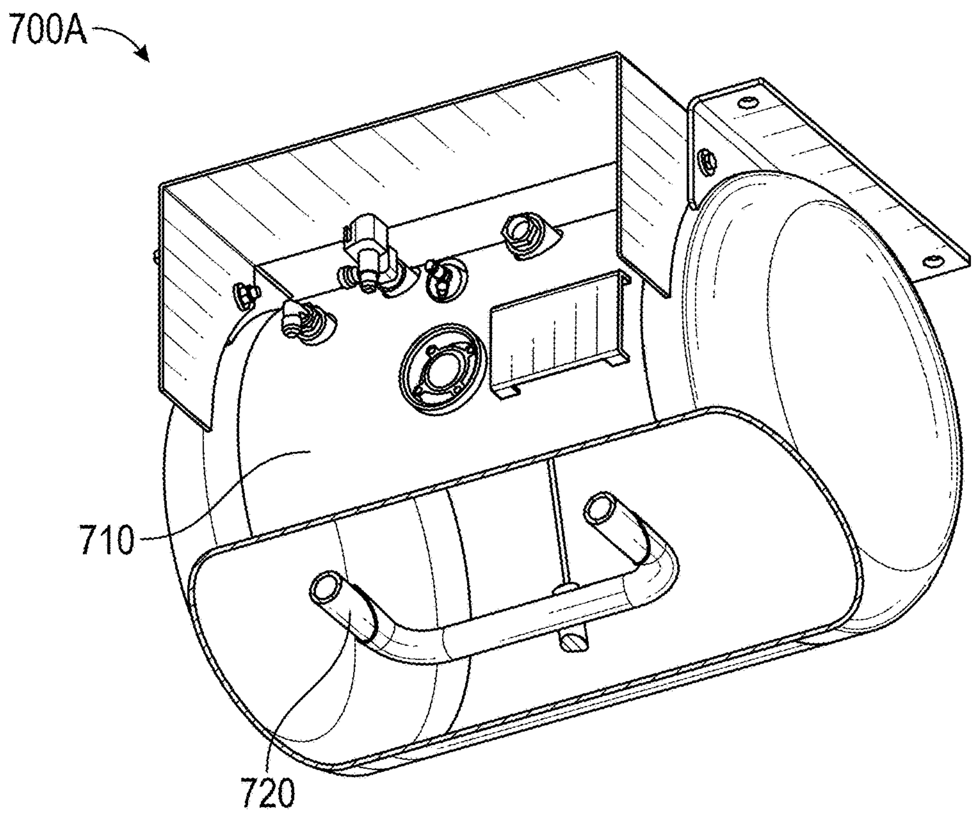
FIGS. 7A and 7B illustrate cut away perspective and side views respectively of alternative examples of a single tank and pipe assembly, in accordance with some embodiments.
Figure 7B:
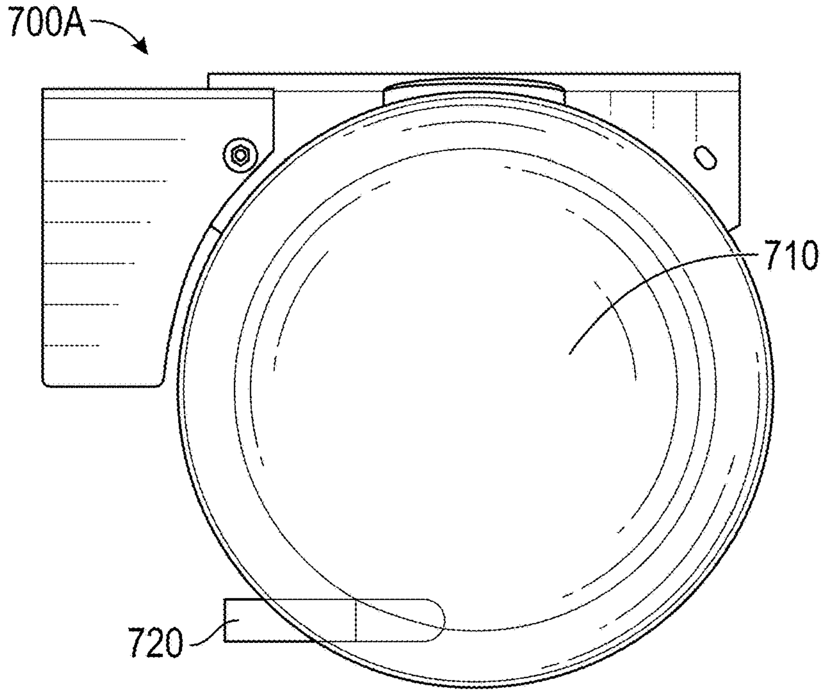

FIGS. 7A and 7B show cut away and/or transparent sections of the tank 710 to shown a single pipe that extend into an inner volume of the tank through the shell of tank 710.

Figure 7C:
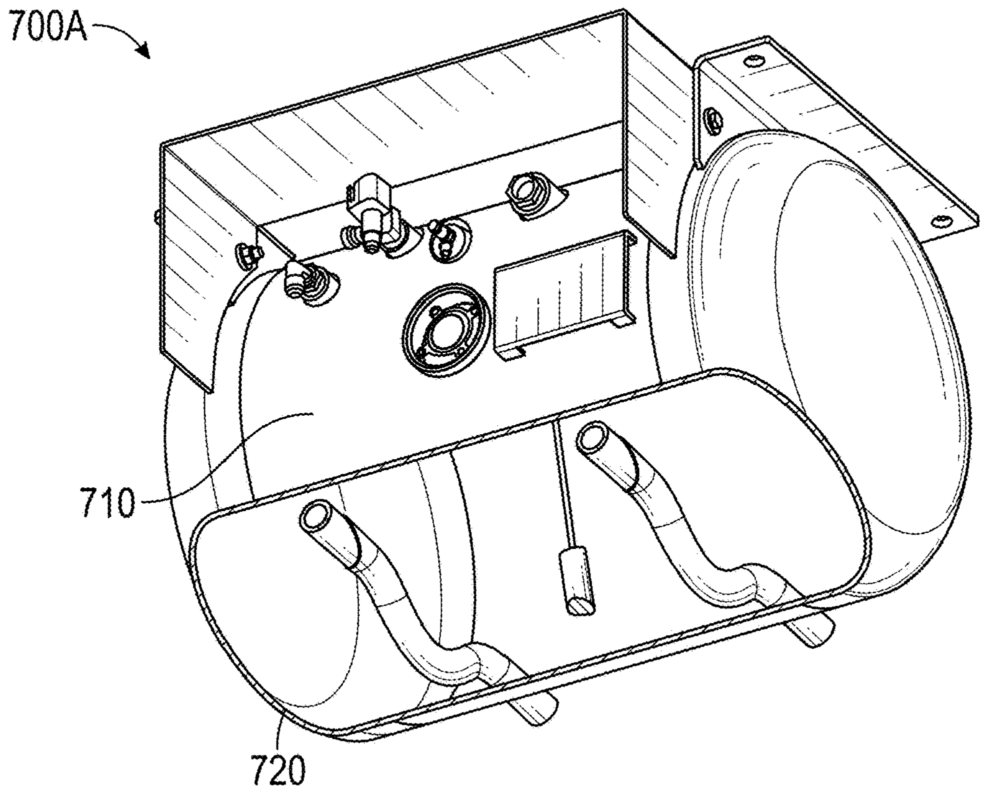
FIGS. 7C and 7D illustrate cut away perspective and side views respectively of alternative examples of a single tank and pipe assembly, in accordance with some embodiments.
Figure 7D:
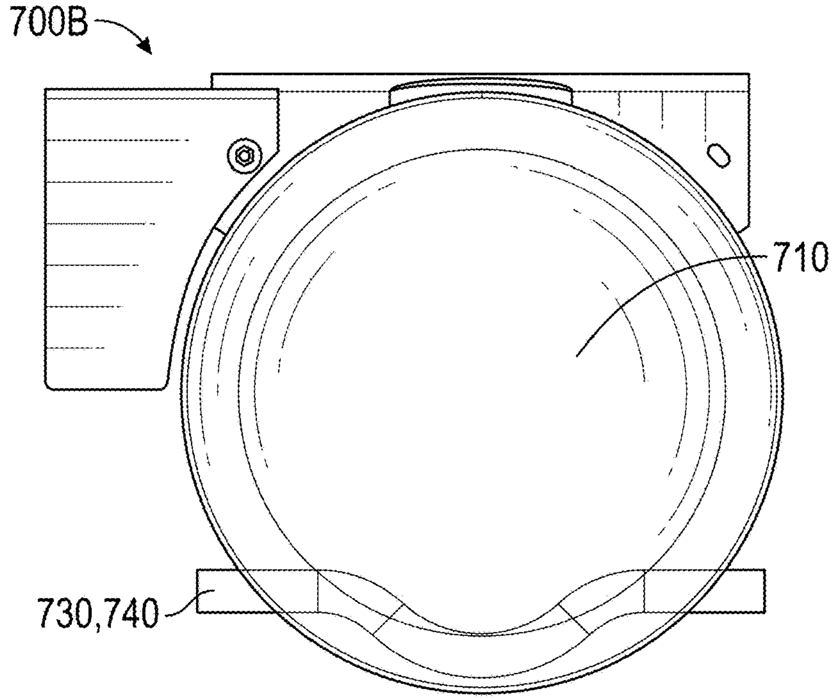

FIGS. 7C and 7D show cut away and/or transparent sections of the tank 710 to show multiple formed pipes 730, 740 that extend into an inner volume of tank 710 through its shell.

Figure 7E:
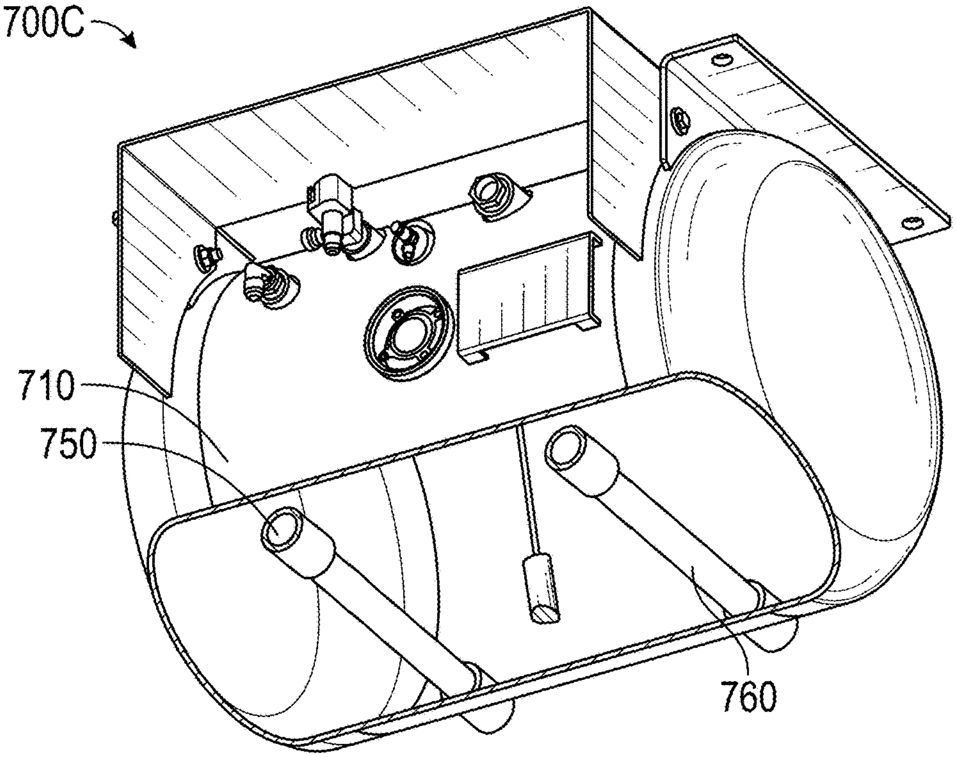
FIGS. 7E and 7F illustrate cut away perspective and side views respectively of alternative examples of a single tank and pipe assembly, in accordance with some embodiments.
Figure 7F:
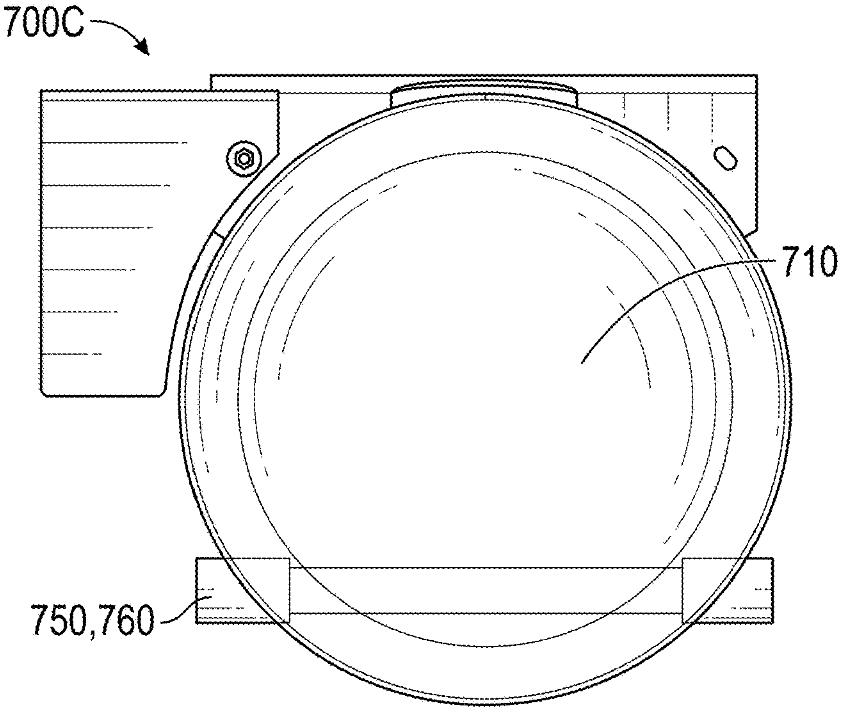

FIGS. 7E and 7F show cut away and/or transparent sections of the tank 710 with multiple pipes 750, 760 extend into an inner volume of tank 710 through its shell.

Other examples of shapes, sizes and configurations of pipes passing through the tank 710 may be provided. For example, one or more pipes entering the tank 710 at a first location, taking different turns (e.g., in a coil formation) and exiting the tank 710 at a second location near or away from the first location.

Figure 8A:
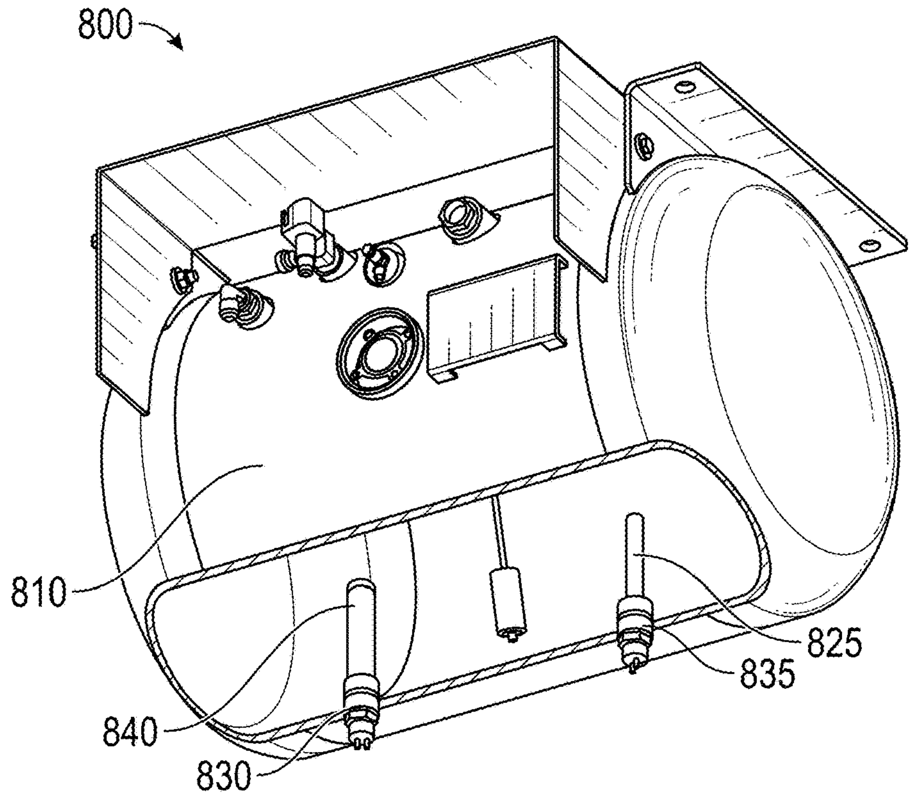
FIGS. 8A and 8B illustrate cut away perspective and side views respectively of an example of a single tank and heating element assembly, in accordance with some embodiments.
Figure 8B:
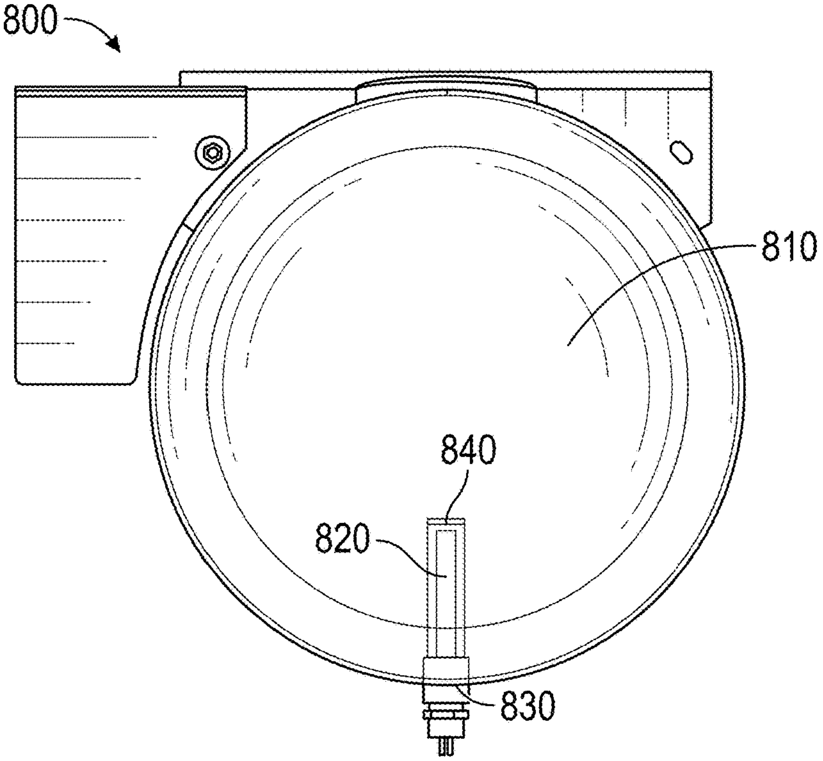

In some embodiments, one or more heating elements may be installed into a fitting. While manifold tanks and heating elements assemblies are also possible, the following description pertains to examples of heating elements in a single tank for ease of presentation. FIGS. 8A and 8B illustrate different perspectives of an example of a single tank and heating element assembly 800, in accordance with some embodiments. One or more heating elements 820, 825 may be installed into one or more fittings 830, 835 on the tank 810 whereby heat may be transferred from the heating element into the contents (e.g., gas and/or liquid) of the tank 810. FIGS. 8A and 8B show transparent sections of the tank 810 with two heating elements 820, 825 installed. In the example shown, the heating element 820 is enclosed in a sealed cavity 840 (i.e., the element 820 itself is not exposed to the tank contents) and the heating element 825 is submerged directly into the tank contents. In some embodiments, a tube may comprise the sealed cavity 840, or may be inserted into the sealed cavity 840 to house the heating element. In some embodiments, the tube may be threaded into the cavity. It should be understood that different combinations and numbers of the installations of heating elements 820, 825 may be used. The heating element 820, 825 type may vary. For example, liquid and/or gas may be passed through the heating element to transfer heat, an electrical element may be installed to generate heat, etc. The size and shape of the fittings, cavities and elements may vary.

Figure 9A:
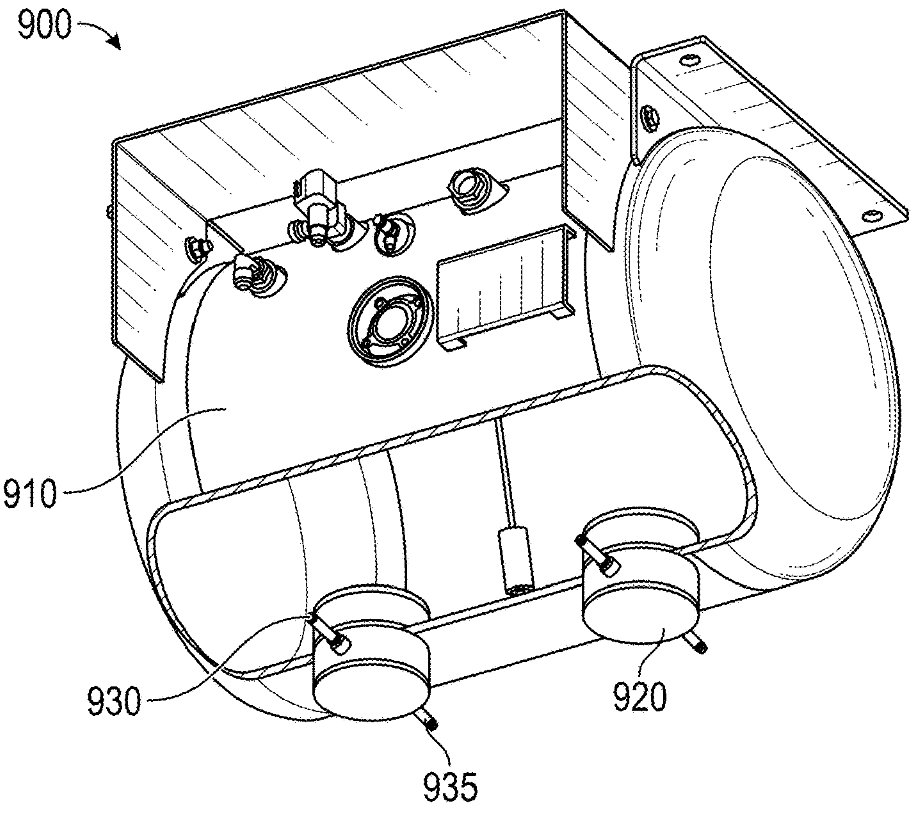
FIGS. 9A and 9B illustrate cut away perspective and side views respectively of an example of a single tank and reservoir assembly, in accordance with some embodiments.
Figure 9B:
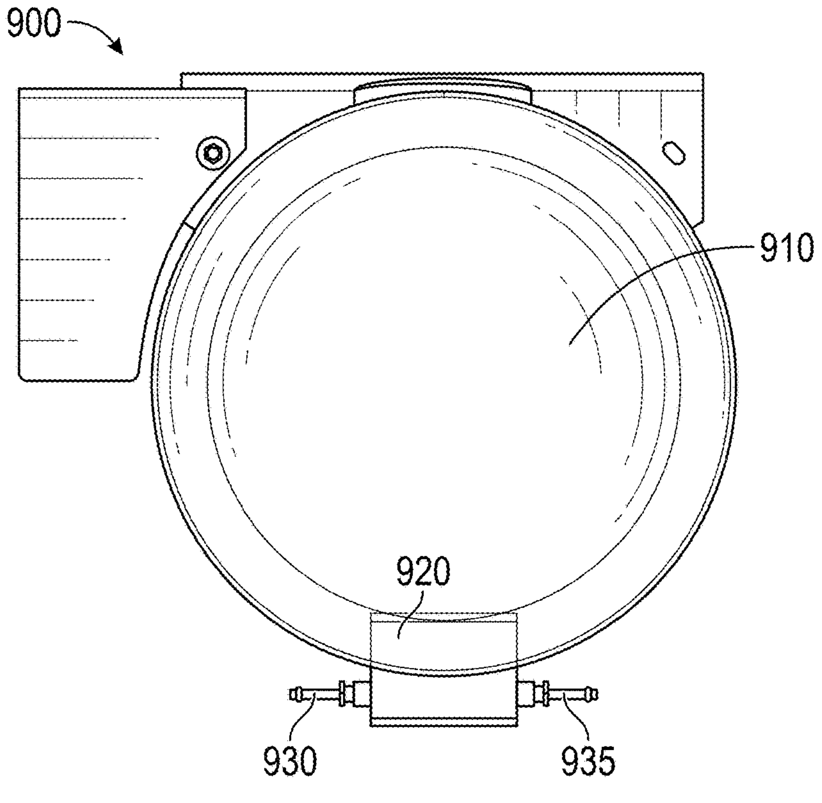

In some embodiments, one or more reservoirs may be welded into a tank. While manifold tanks and reservoir assemblies are also possible, the following description pertains to examples of reservoirs in a single tank for ease of presentation FIGS. 9A and 9B illustrate different perspectives of an example of a single tank and reservoir assembly 900, in accordance with some embodiments. The heated liquid and/or gas may fill the reservoir 920 through the inlet 930 and exit the outlet 935. The heated contents (e.g., liquid and/or gas) passing through the reservoir 920 transfers heat into the tank 910. In some embodiments, the reservoir may be completely or partially inside the tank. For example, the reservoir may be welded or fastened (i.e., bolted, tied, etc.) inside the tank with pipe/hose used to allow the heated liquid and/or gas in and out of the reservoir.

FIGS. 9A and 9B show transparent sections of the tank with two reservoirs. The reservoirs can be used individually or pipe/hose can connect them together. Size, shape and location may vary.

It should be noted that where the heating element, reservoir, piping or other component is in contact with the internal tank pressure, it may be possible for the tank pressure to enter the system carrying the heated liquid/gas.

In these cases, a pressure sensor or similar component may be used to monitor the pressure in the system carrying the heated liquid and/or gas. When an elevated pressure is indicated, solenoid valves or similar components may be used to isolate the heating element, reservoir, piping or other component from the rest of the system carrying the heated liquid and/or gas.

Figure 10:
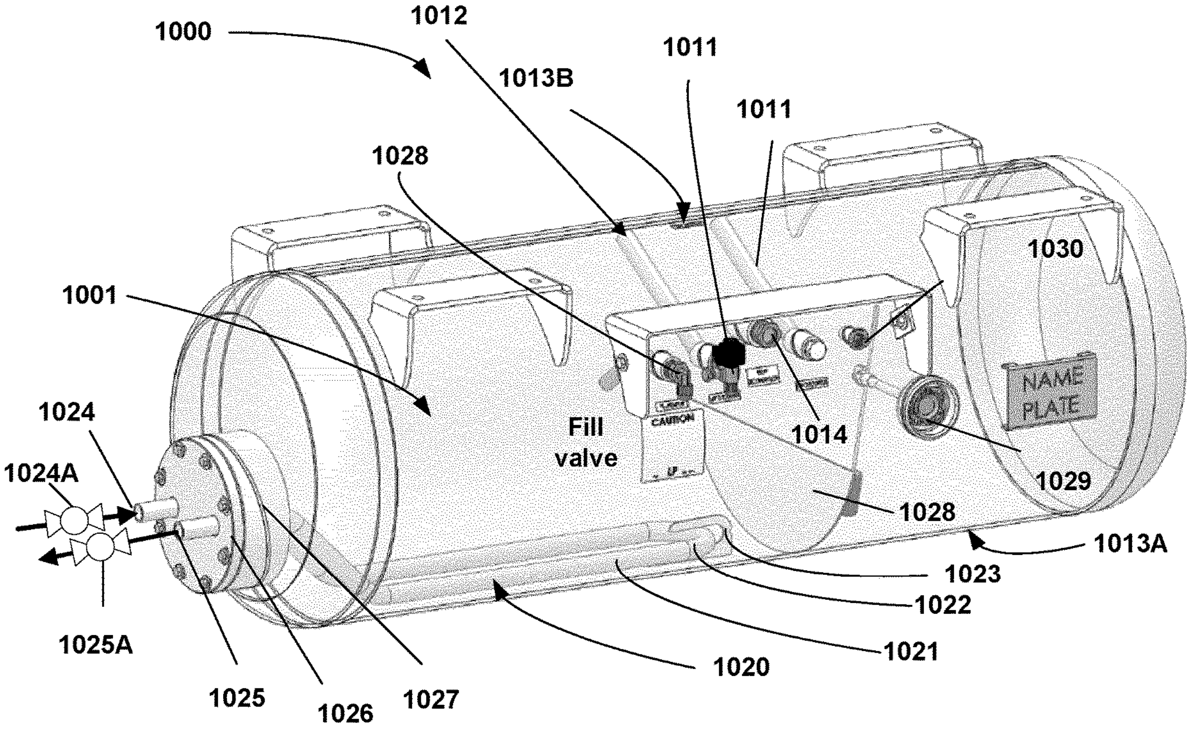
FIG. 10 illustrates a perspective view of an example tank, in accordance with some embodiments.

FIG. 10 illustrates a perspective view of example tank 1000, in accordance with some embodiments. Tank 1000 comprises an inner volume 1001 for receiving and storing a fuel. Tank 1000 may be in fluid communication with a fuel system 1010, e.g. a fuel system of a motor vehicle, via fuel line 1011 which is configured to receive fuel in tank 1000, e.g. to power an engine of the motor vehicle. As shown fuel line 1011 may be positioned to have an opening 1012 positioned generally upward opposing a base 1013A of tank 1000. Additional fuel lines 1011 may be provided if fuel demand is high. In an embodiment, opening 1012 may be positioned within the upper 50% volume of tank 1000, preferably within the upper 20% volume of tank 1000 to draw vapour into fuel line opening 1012. In another embodiment, opening 1012 may be positioned within the lower 50% volume of tank 1000, preferably within the lower 20% volume of tank 1000 to draw liquid into fuel line opening 1012. Tank 1000 may comprise a pressure relief valve 1014 which is configured to open when a threshold safety pressure value is met. In an example, the pressure relief valve may be open when the pressure inside the tank is greater than or equal to the maximum allowable working pressure of the tank. In an example, the maximum allowable working pressure may be about 312 psi. When pressure safety valve 1014 opens, fuel within tank 1000 may be released from inner volume 1001 to mitigate against overpressure and failure of tank 1000.

Tank 1000 may also comprise heating system 1020. Heating system 1020 may comprise a conduit 1021 for circulating heat transfer fluid through tank 1000. Because flow of heat transfer fluid through conduit 1021 may be intermittent and for variable durations to time, conduit 1021 may be configured for thermal expansion and contraction when heat transfer fluid flows through conduit 1021 or flow is stopped respectively. Thermal expansion and contraction may damage conduit 1021 over time. As such, conduit 1021 may be made from metal segments welded together, where the welds are formed using techniques to minimize stresses in the metal, e.g. arc, TIG, MIG welding, and/or post welding heat treatment. Metal(s) and/or alloy of conduit 1021 may also be stress relieved. Conduit 1021 may be positioned within the bottom 50% volume of tank 1000, preferably within the bottom 10% volume of tank 1000 to be define within a liquid volume of the fuel within tank 1000. In an example, conduit 1021 may abut an inner surface of base 1013A of tank 1000 and extend along a length of an inner surface of tank 1000. Conduit 1021 may extend into the inner volume 1001 as shown in FIG. 10. Inlet 1024 and outlet 1025 of conduit 1021 may be supported by tank 1000. As shown in FIG. 10, inlet 1024 and outlet 1025 may be both extend through and be supported by mounting flange 1026 which may seal an opening 1027 defined by tank 1000. Mounting flange 1026 may be coupled to tank 1000 by fasteners such, as nuts/bolts, screws to releasably couple mounting flange 1026 to tank 1000 such that mounting flange 1026 may be removed from tank 1000 to allow access to inner volume 1001 and conduit 2021 through opening 1027, e.g. for maintenance. In other example, mounting flange 1026 may be welded and/or riveted to couple mounting flange 1026 to tank 1000 and seal opening 1027 closed. Conduit 1021 may comprises an expansion loop 1022 which is supported in bracket support 1023. Expansion loop 1022 may allow a length of conduit 2021 to expand or contract as conduit 1021 undergoes temperature changes. In an example, when conduit 1021 receives heat transfer fluid having a higher temperature than conduit 1021, conduit 1021 may expand toward expansion loop 1022. Alternatively, when conduit 1021 cools it may contract. Expansion loop 1022 reduces stress on the conduit in comparison to straight pipe runs. As shown, conduit 1021 comprises an inlet 1024 and outlet 1025, for receiving and sending heat transfer fluid from and to a heat source respectively. In an example, the heat source may be a radiator system of a motor vehicle, and the heat transfer fluid may be any one of water, glycol, combinations thereof, or other radiator fluid. The radiator system may have a normal radiator operating pressure. Radiator system may operate in range of pressures. In an example, the radiator operating pressure may be in a range of 15-35 psi, in a range of 15-20 psi, or in a range of 20-35 psi. Valves 1024A, 1025A may be positioned on inlet 1024 and outlet 1025 respectively. Valves 1024A, 1025A may control flow of heat transfer fluid through conduit 1021 and tank 1000. Tank 1000 may also comprise at least one baffle 1028 defining a portion of inner volume 1001 surrounding fuel line 1011. Baffles 1028 may extend vertically from base 1013A of tank 1000 toward an opposing top end 1013B of tank 1000 to define a portion of inner volume 1001 around fuel line 1011. Baffles 1028 may be provided to maintain a liquid fuel level immediately surrounding fuel in 1011. As shown in FIG. 10, fuel line 1011 may comprise a valve for coupling to a fuel system for receiving fuel. In an example, the fuel system may be an engine fuel system or a burner. In an example, the burner may be a heater for home heating or agricultural heating. Tank 1000 may comprise port 1028 for receiving fuel to fill tank 1000, a level gauge 1029 for monitoring a liquid fuel level in tank 1000, and a bleeder point 1030 for manual verification that the liquid level is below a safety level, e.g. 80% of the volume of tank 1000.

Figure 11:
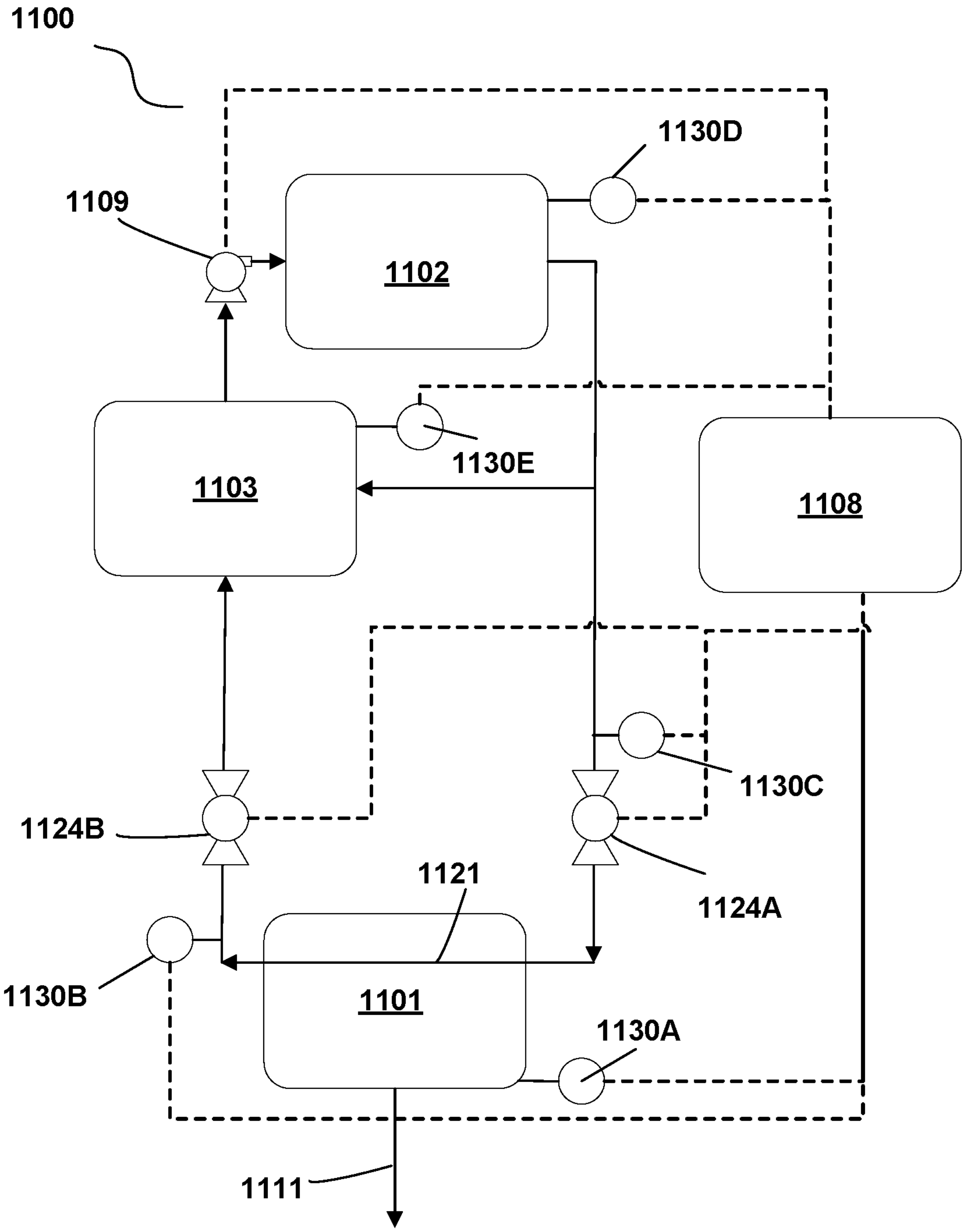
FIG. 11 illustrates a schematic view of a system comprising a tank in accordance with an embodiment of the present application.

FIG. 11 illustrates a system 1100 for controlling the flow of heat exchange fluid to a tank according to some embodiments. System 1100 may comprise a heat source 1102 and a tank 1101. Tank 1101 may be any tanks described in this disclosure, e.g. tank 100, 400, 500, 1000, etc. Heat source 1102 may be any component of system 1100 that generates heat and requires to be cooled by a heat transfer fluid. In an example, heat source 1102 may be a component of an engine, e.g. a motor vehicles engine, exhaust system, power steering assembly, and/or air conditioning system. System 1100 may also comprise a radiator 1103 to cool heat transfer fluid circulated to heat source 1102. Radiator 1103 may be any suitable convection and/or conduction heat transfer device to cool heat transfer fluid. In an example, radiator 1103 may be a radiator of a motor vehicle such as a U.S. class 3 (or greater) truck. Heat transfer fluid may be circulated through system 1100 by pump 1109, or by thermosiphon. Tank 1101 of system 1100 may comprise at least one flow valve 1124A, 1124B configured to control flow from heat source 1102 to through conduit 1121 of tank 1101. Conduit 1121 may be any conduit, pipe, or tube described in this disclosure to circulate heat transfer fluid for heat transfer with a tank according to this disclosure. In an example, conduit 1121 may be conduit 1021 described with reference to FIG. 10. As shown in FIG. 11, system 1100 comprises flow valves 1124A, 1124B positioned on the intel and outlet of tank 1101, which when closed may isolate tank 1101 from the rest of system 1100. Because tank 1101 may contain fuel that is combustible, in the event of a leak or breach of conduit 1121 that allows fuel from tank 1101 to enter conduit 1121, flow valves 1124A, 1124B may be configured to close restricting fuel from entering radiator 1103 and/or heat source 1102. When opened, flow valves 1124A, 1124B send heat transfer fluid to flow through conduit 1121 which is in thermal communication with the inner volume of tank 1101 allowing heat to transfer from heat transfer fluid to fuel within tank 1101 via conduit 1121. Tank 1101 may be configured to receive and store fuel for use in an engine fuel system. Fuel line 1011 may be configured to couple to and be in fluid communication with the engine fuel system using a valve, quick-coupling assembly, or other fasteners to fluidly communicate fuel line 1011 with the engine fuel system.

System 1100 may comprise controller 1108 for controlling the at least one flow valves 1124A, 1124B, and the flow of heat transfer fluid through the valves. System 1100 may also comprise a plurality of sensors for determining the temperature and/or pressure in each component of system 1100. Controller 1108 may be in communication with flow valves 1124A, 1124B to control flow through tank 1101; in communication with pump 1109 for controlling a flow rate of heat transfer fluid through heat source 1102; and in communication with sensors 1130A-E for receiving sensor data. Sensors 1130A-E may be temperature, pressure, and/or flow sensors. In an example, sensor 1130A may measure temperature and/or pressure within tank 1101; sensor 1130B may measure pressure on the outlet of tank 1101; sensor 1130C may measure flow rate of heat transfer fluid through conduit 1121; sensor 1130D may measure temperature and/or pressure of heat source 1101; and sensor 1130E may measure temperature and/or pressure of heat transfer fluid in radiator 1103. Controller 1108 may be configured to control heat transfer fluid flow through conduit 1121 to heat fuel within tank 1101. Controller 1108 may be configured to actuate valve and flow heat transfer fluid through conduit 1121 when pressure/temperature within tank 1101 is below a first threshold value and raise pressure inside tank 1101 above a second threshold value. In an example, the first threshold pressure value may be in a range of about 0-500 psi, 0-250 psi, 100-150 psi, or about 150 psi. The second threshold may be the same or greater than the first threshold. In an embodiment, the second threshold value may be a pressure less than or equal to 75% of a maximum allowable working pressure (MAWP) of tank 1101. In an example, the MAWP is about 500 psi.

Figure 12:
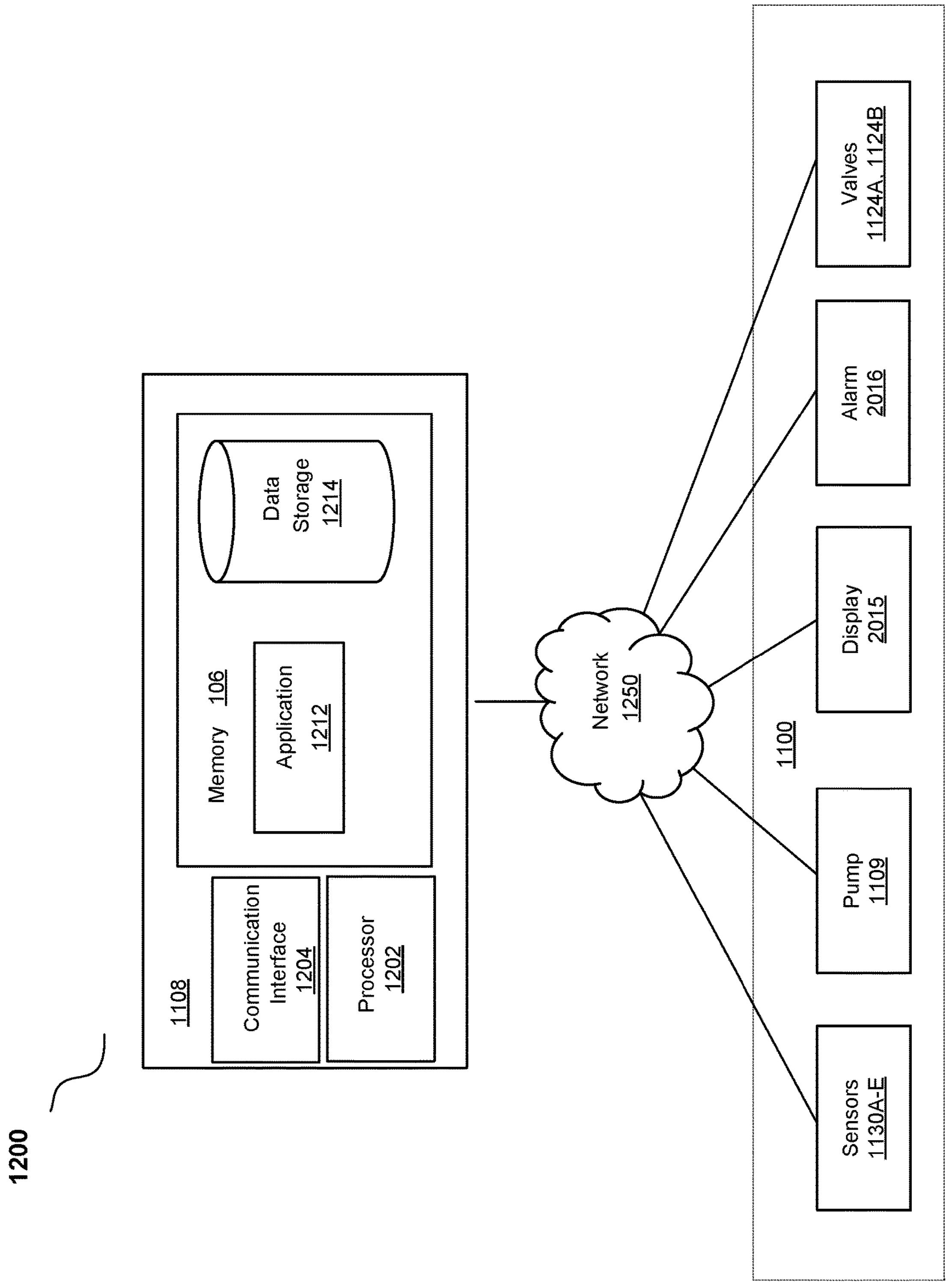
FIG. 12 illustrates a schematic view of a control system for a fuel tank assembly, in accordance with an embodiment of the present application.

FIG. 12 shows an example system 1200 for controlling temperature and/or pressure of a fuel in a tank and pipe assembly according to this disclosure. The tank and pipe assembly may be any of the tank and pipe assemblies described in this disclosure. The embodiment illustrated in FIG. 12 references the system 1100 shown in FIG. 11 as a non-limiting example to explain how system 1200 may control temperature and pressure of a fuel in tank and pipe assemblies according to this disclosure. System 1200 may comprise controller 1108 which, in an example, may be controller in a control system of a motor vehicle. Controller 1108 includes a processor 1202 configured to implement processor readable instructions that, when executed, configure the processor 1202 to conduct operations described herein. The processor 1202 may be a microprocessor or microcontroller, a digital signal processing (DSP) processor, an integrated circuit, a field programmable gate array (FPGA), a reconfigurable processor, a programmable read-only memory (PROM), or combinations thereof. In a non-limiting example micro-controller may be a 32-bit AURIX™ TriCore™ microcontroller. The controller 1108 may include a communication interface 1204 to communicate with other computing or sensor devices, to access or connect to network resources, or to perform other computing applications by connecting to a network (or multiple networks) capable of carrying data. In some examples, the communication interface 1204 may include one or more busses, interconnects, wires, circuits, and/or any other connection and/or control circuit, or combination thereof. The communication interface 1204 may provide an interface for communicating data between tank and pipe assemblies, and sensors according to this disclosure and a display 2015 or an alarm 2016. Display 2015 may be a display in a motor vehicle and/or a remote device of computer. In some embodiments, the one or more busses, interconnects, wires, circuits, or the like may be the network of conductive and non-conductive fibers of a smart textile. An alarm described herein, may be any indication that pressure and/or within the tank is too low, or too high; or that pressure within conduit 1121 is to high. Non-limiting examples of alarms are visual alerts on a display or a light of a motor vehicle; or auditory alerts from a speaker of the motor vehicle.

Controller 1108 may be coupled to the at least one of a an sensors 1130A-E, pump 1109, display 2015, and/or alarm 2016 via a network 1250. Sensors 1130A-E may each be any of a pressure transducer, temperature transducer, or flow transducer. The network 1250 may include any wired or wireless communication path, such as an electrical circuit. In some embodiments, the network 1250 may include one or more busses, interconnects, wires, circuits, and/or any other connection and/or control circuit, or a combination thereof. In some embodiments, the network 1250 may include a wired or a wireless wide area network (WAN), local area network (LAN), a combination thereof, or the like. In some embodiments, the network 1250 may include a Bluetooth® network, a Bluetooth® low energy network, a short-range communication network, or the like.

Controller 1108 may include memory 1206. The memory 1206 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 1206 may store an application 1212 including processor readable instructions for conducting operations described herein. In some examples, application 1212 may include operations for controlling temperature and/or pressure in tank 1101. Controller 1108 may receive real time data indicative of a temperature and/or pressure in tank 1101 from sensor 1130A. Initially, if the temperature and/or pressure value is greater than a threshold value, at least one of valves 1124A, 1124B may be closed. In an example, the threshold value may be a safety threshold value above a minimum pressure required for an engine to operate. Continuing the example, the minimum pressure of fuel inside tank 1101 required to operate an engine may be 150 psi, and the safety threshold value may be in a range of 1-100 psi above the minimum pressure to operate the engine. In an example, the safety threshold value is at least greater than 10 psi above the minimum pressure required for the engine to operate. When a pressure of fuel inside tank 1101 is above the first threshold value, the engine may have sufficient fuel pressure to operate and application 1212 may close at least one of valve 1124A, 1124B to stop flow heat transfer fluid through conduit 1121 of tank 1101. If temperature and/or pressure is less than or equal to the first threshold value, application 1212 may cause controller 1108 to generate an output for communicating a signal to valve(s) 1124A, 1124B to open. When valves 1124A, 1124B open, a portion of heat transfer fluid circulating from heat source 1102, e.g. an engine of a motor vehicle, to radiator 1103 may be diverted through conduit 1121 to provided heat to tank 1101 and fuel therein. As heat transfer fluid is circulated through conduit 1121, temperature and/or pressure of the fuel within tank 1101 may increase until a second threshold value is exceeded causing controller 1108 to generate an output to communicate a signal to at least one of valve 1124A, 1124B to close. This control strategy may prevent the fuel tank from over heating. In an example, the second threshold may be 75% of the MAWP. The MAWP may be about 500 psi in some examples. Continuing this example, application 1212 may include an operation for generating an output to signal alarm 2016 when temperature and/or pressure within tank 1101 is below the first threshold value. Alarm 2016 may be visual indication such as a light, e.g. a light on a dashboard of a motor vehicle, or indication on display 2015. Alarm 2016 may also be an audible indication such as a noise from a speaker. Application 1212 may include an operation to generating an output to signal alarm 2016 to cease when the second threshold is met.

In another example, application 1212 may include an operation for controlling flow of heat transfer fluid through tank 1101. Controller 1108 may receive real time data indicative of a flow rate of heat transfer fluid through conduit 1121 from sensor 1130C, and a temperature and/or pressure from sensors 1130A, 1130E, and/or 1130D. Controller 1108 may then generate an output to communicate a signal to valves 1124A, 1124B to control the flow rate through conduit 1121 to maintain temperature and/or pressure within tank 1101 in a desired range. The desired range may be a range higher than the threshold value above the minimum pressure required for an engine to operate. Data from sensor 1130E indicative of pressure and/or temperature of heat transfer fluid in radiator 1103; sensor 1130D indicative of pressure and/or temperature of heat transfer fluid in heat source 1102; and pump 1109 may also be used to by controller 1108 to control valves 1124A, 1124B and the flow rate through conduit 1121.

In another example, application 1212 may include an operation for isolating a pipe of tank and pipe assemblies according to this disclosure. Heat transfer fluid circulating in system 1100 from radiator 1103 to heat source 1102, and optionally to tank 1101, may be maintained at an operating pressure which may be in a range 10-50 psi, in a range of 15-35 psi, in a range of 15-20 psi, in a range of 20-35 psi, or about 20 psi. Controller 1108 may receive real time data indicate of a pressure in conduit 1121 from sensor 1130B which may be positioned on an outlet of conduit 1121 from tank 1101. Sensor 1130B may also be positioned between tank 1101 and radiator 1103, and/or directly in radiator 1103. In the event of a loss of containment, e.g. a leak between conduit 1121 and the inner volume of tank 1101, pressure in conduit 1121 will increase as fuel enters conduit 1121 because the normal operating pressure within the radiator and conduit 1121 is lower than the pressure within tank 1101. For example, radiator and conduit 1121 may be about 20 psi and tank 1101 may be about greater than 150 psi. To prevent fuel from reaching radiator 1103 and/or heat source 1102, controller 1108 will isolate conduit 1121 by closing valves 1124A, 1124B. Controller will receive real time data of pressure in conduit 1121 from sensor 1130B and when the pressure increases above a threshold value, which may be selected to be a value above the normal operating pressure of heat transfer fluid in conduit 1121 indicative of a loss of containment, e.g. 5-10 psi above the normal operating pressure, controller 1108 will cause valves 1124A, 1124B to close. In an example, the threshold value is about 25 psi. When valves 1124A, 1124B close and isolate conduit 1121 fuel leaking into conduit 1121 and heat transfer fluid cannot enter radiator 1103 and/or heat source 1102. Continuing this example, application 1212 may include an operation for generating an output to signal alarm 2016 when pressure within conduit 1121 exceeds the threshold value. Alarm 2016 may be visual indication such as a light, e.g. a light on a dashboard of a motor vehicle, or indication on display 2015. Alarm 2016 may also be an audible indication such as a noise from a speaker.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A fuel tank assembly comprising:

a fuel tank having an inner volume defined by the fuel tank, the fuel tank configured to couple to, and fluidly communicate a fuel to a fuel system of a motor vehicle; and at least one conduit coupled to said fuel tank, wherein an inlet of the at least one conduit is configured to fluidly communicate with and a receive heat transfer fluid from an engine of the motor vehicle, the engine being a heat source of the motor vehicle and an outlet of the at least one conduit is configured to fluidly communicate with and send the heat transfer fluid to the engine, wherein a portion of the at least one conduit is defined within the inner volume, and wherein the portion at least one conduit comprises an expansion loop supported by a bracket support;

wherein the heat transfer fluid comprises engine coolant heated by operation of the engine, and wherein the at least one conduit is in thermal communication with the inner volume of the fuel tank for transferring heat from the heat transfer fluid to the fuel within the fuel tank to raise a temperature of the fuel and thereby increase a vapor pressure of the fuel for delivery to the fuel system of the motor vehicle.

2. The fuel tank assembly of claim 1,, and wherein the inlet and outlet extend through a mounting flange of the fuel tank, and wherein the inlet and outlet are supported by the mounting flange.

3. The fuel tank assembly of claim 1, comprising at least one reservoir coupled to the fuel tank, each of the at least one reservoir in fluid communication with a corresponding conduit of the at least one conduit, wherein the reservoir is in thermal communication with the inner volume of the fuel tank.

4. The fuel tank assembly of claim 1, comprising a first valve positioned to control flow through the inlet of the at least one conduit, and a second valve positioned to control flow through the outlet of the at least one conduit, wherein when closed, each of the first valve and second valve are positioned to isolate a portion of the at least one conduit defined within the inner volume of fuel tank from the engine.

* * * * *